United States Patent [19]

Rosenbaum

[11] Patent Number: 5,287,271
[45] Date of Patent: Feb. 15, 1994

[54] DATA PROCESSING SYSTEM FOR OPTIMIZED MAIL PIECE SORTING AND MAPPING TO CARRIER WALK SEQUENCE USING REAL TIME STATISTICAL DATA

[75] Inventor: Walter S. Rosenbaum, Bethesda, Md.

[73] Assignee: International Business Machines Corporation, Armonk, N.Y.

[21] Appl. No.: 748,983

[22] Filed: Aug. 22, 1991

[51] Int. Cl.[5] .................................... G06F 15/21
[52] U.S. Cl. .................................... 364/409; 364/478
[58] Field of Search ........... 364/409, 401, 478, 464.02; 209/584, 900, 3.1

[56] References Cited

U.S. PATENT DOCUMENTS

| | | |
|---|---|---|
| 4,632,252 | 12/1986 | Haruki et al. |
| 4,832,204 | 5/1989 | Handy et al. |
| 5,005,124 | 4/1991 | Connell et al. ............... 364/401 |
| 5,031,223 | 7/1991 | Rosenbaum et al. ........ 364/478 |
| 5,051,914 | 9/1991 | Sansone et al. ............... 364/478 |
| 5,068,797 | 11/1991 | Sansone et al. ............... 364/478 |
| 5,072,401 | 12/1991 | Sansone et al. ............... 364/478 |
| 5,077,694 | 12/1991 | Sansone et al. ............... 395/600 |

FOREIGN PATENT DOCUMENTS 0095737 12/1983 European Pat. Off.

OTHER PUBLICATIONS

R. E. Cox et al., "Two-Machine Mixed Parcel Sorting Apparatus and Method", IBM TDB, vol. 15, No. 4, Sep. 1972, pp. 1158-1160.

Primary Examiner—Donald E. McElheny, Jr.
Attorney, Agent, or Firm—John E. Hoel

[57] ABSTRACT

A data processing system, method and program are disclosed to optimize mail piece sorting and the mapping of mail down to the carrier walk sequence using real time statistical data. The invention makes use of techniques such as fast OCR devices at a sending location or deferred processing of OCR scanned mail, to accumulate volume statistics indicating the number of mail pieces being routed particular addressees at a destination postal region on a given day. The information for mail volumes being directed to a particular postal region are collected over data communications links prior to the receipt of the actual mail pieces. The efficiency of sorting is maximized at the destination postal region by organizing the sorting apparatus to remove the highest volume addressee's mail first. This requires the compilation of the real time volume statistics from all of the sending postal regions sending mail to the destination postal location. In this manner, the maximum number of letters on every pass through the sorting apparatus can be achieved at the destination location. This minimizes the total number of reading operations required in order to achieve a desired level of mail sorting separation. Because the mail volume statistics are available at the destination location prior to sorting, at each stage of the sorting operations, bin allocation can be customized to yield the highest final patron or addressee sort. In this manner, the time for every subsequent pass through the sorting apparatus is reduced. This enables sorting directly to the addressee level and the distribution of the mail down to carrier walk sequence.

18 Claims, 26 Drawing Sheets

| SENDING POST OFF. | DAY # 52 | SHIFT | HOUR | MIN | SEC | 1/10 | |
|---|---|---|---|---|---|---|---|
| 1100011 | 000110100 | 01 | 001 | 000001 | 000010 | 0100 | La |
| 1100011 | 000110100 | 01 | 011 | 000010 | 000100 | 0010 | Lb |
| 1100011 | 000110100 | 10 | 101 | 000100 | 001000 | 0001 | Lc |
| 0001111 | 000110100 | 01 | 001 | 000100 | 000100 | 0001 | Ld |
| 0001111 | 000110100 | 01 | 011 | 001000 | 001001 | 0010 | Le |
| 0001111 | 000110100 | 10 | 101 | 010001 | 010000 | 0100 | Lf |
| 0100011 | 000110100 | 01 | 001 | 000010 | 001000 | 0010 | Lg |
| 0100011 | 000110100 | 01 | 011 | 000100 | 000010 | 0001 | Lh |
| 0100011 | 000110100 | 10 | 101 | 001000 | 000010 | 0110 | Li |

| | | | STARTING NUMBER ENCLOSED | | | | ENDING NUMBER ENCLOSED | | | |
|---|---|---|---|---|---|---|---|---|---|---|
| SENDING P.O. | DAY # 52 | SHIFT | HOUR | MIN | SEC | 1/10 | HOUR | MIN | SEC | 1/10 |
| 1100011 | 000110100 | 01 | 001 | 000001 | 000010 | 0100 | 011 | 000010 | 000100 | 0010 |

FIG. 4A

MAIL PIECE La  
ID NUMBER 123'

1100011 000110100  01  001  000001 000010 0100  La  
|||||||| |||||||||  ||  |||  |||||| |||||| ||||  
ID BAR CODE 123

FIG. 4B

MAIL PIECE Le  
ID NUMBER 123'

0001111 000110100  01  011  001000 001001 0010  Le  
|||||||| |||||||||  ||  |||  |||||| |||||| ||||  
ID BAR CODE 123

FIG. 4C

MAIL PIECE Li  
ID NUMBER 123'

0100011 000110100  10  101  001000 000010 0110  Li  
|||||||| |||||||||  ||  |||  |||||| |||||| ||||  
ID BAR CODE 123

FIG. 15
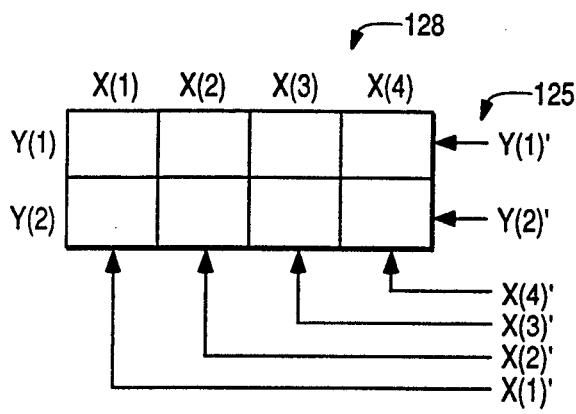
FIG. 11
| MAIN STREET = CARRIER Ca |
| OAK STREET = CARRIER Cd |
| ELM STREET = CARRIER Cc |
| PARK PLACE = CARRIER Cd |
| FORREST AVE = CARRIER Ce |
FIG. 12
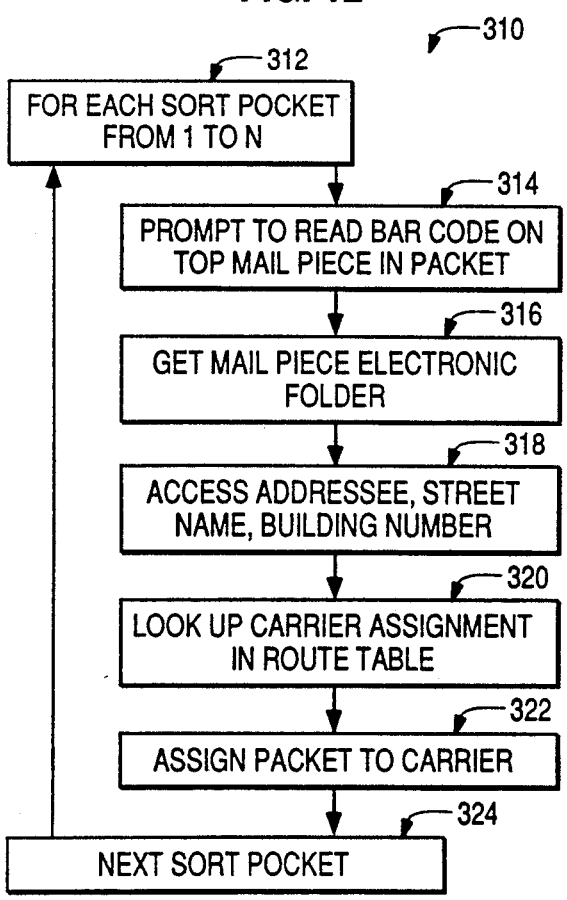
FIG. 7
| FIG. 7A |
| FIG. 7B |
| FIG. 7C |
| FIG. 7D |
| FIG. 7E |

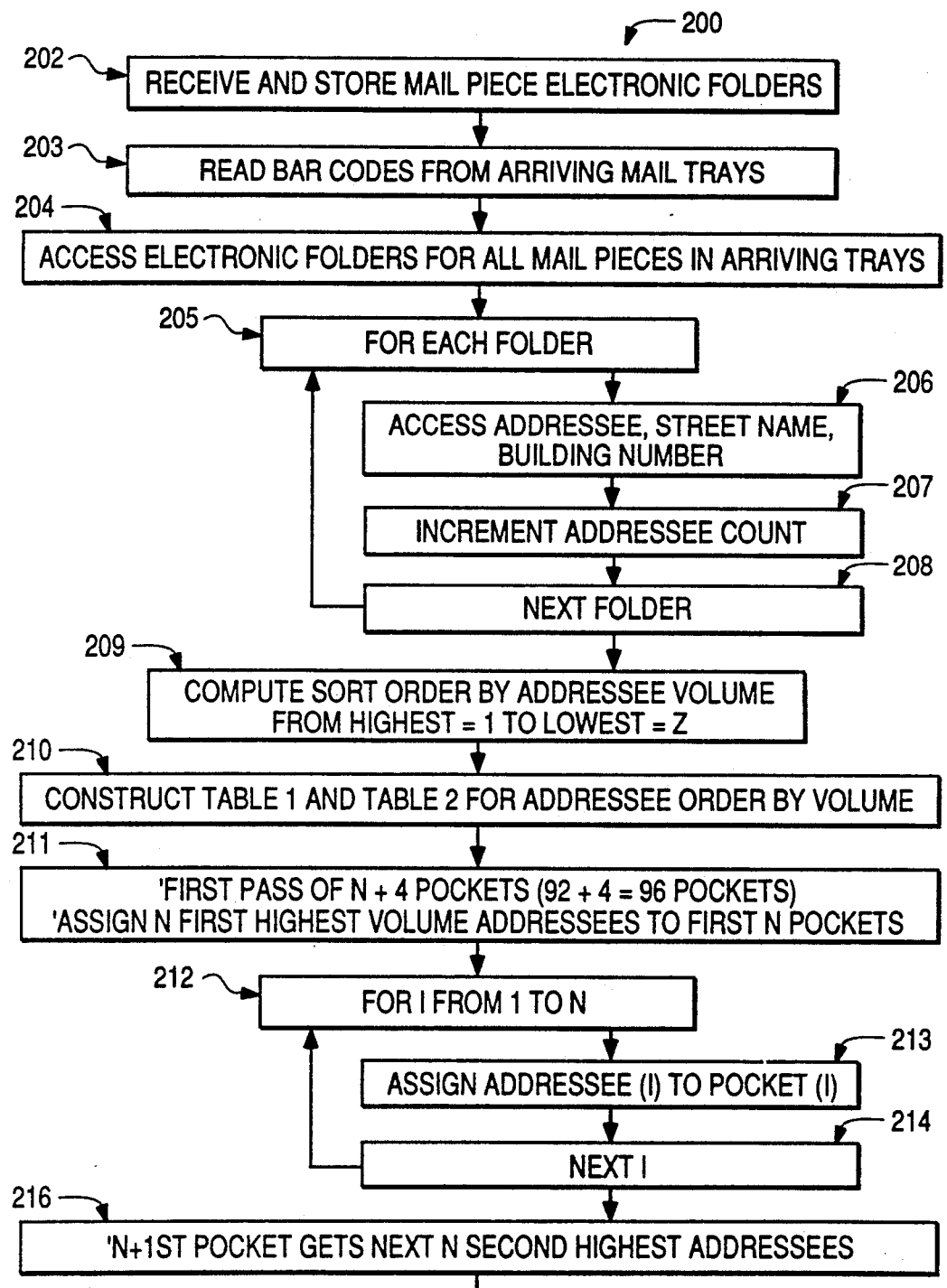
FIG. 7A1

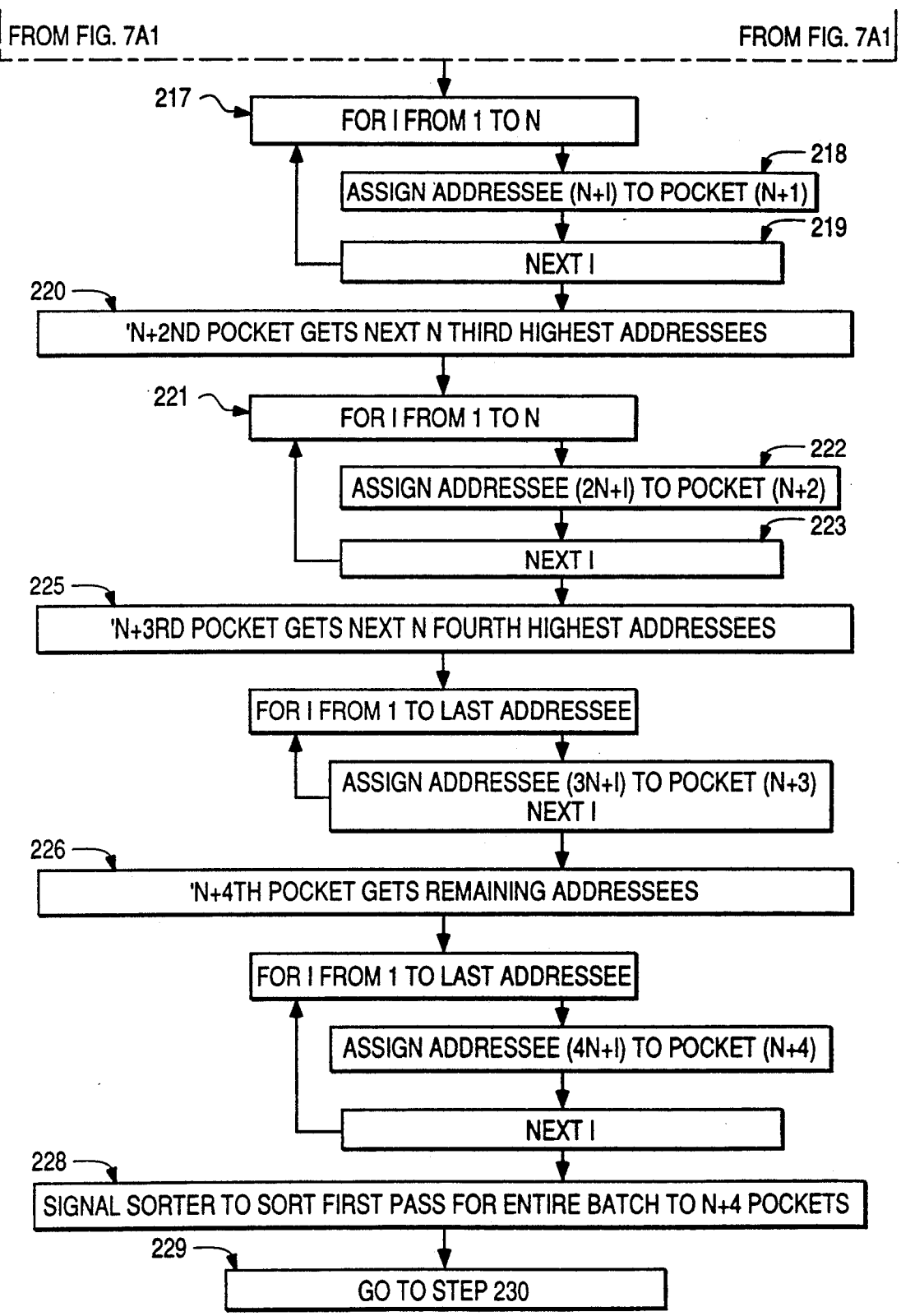
FIG. 7A2

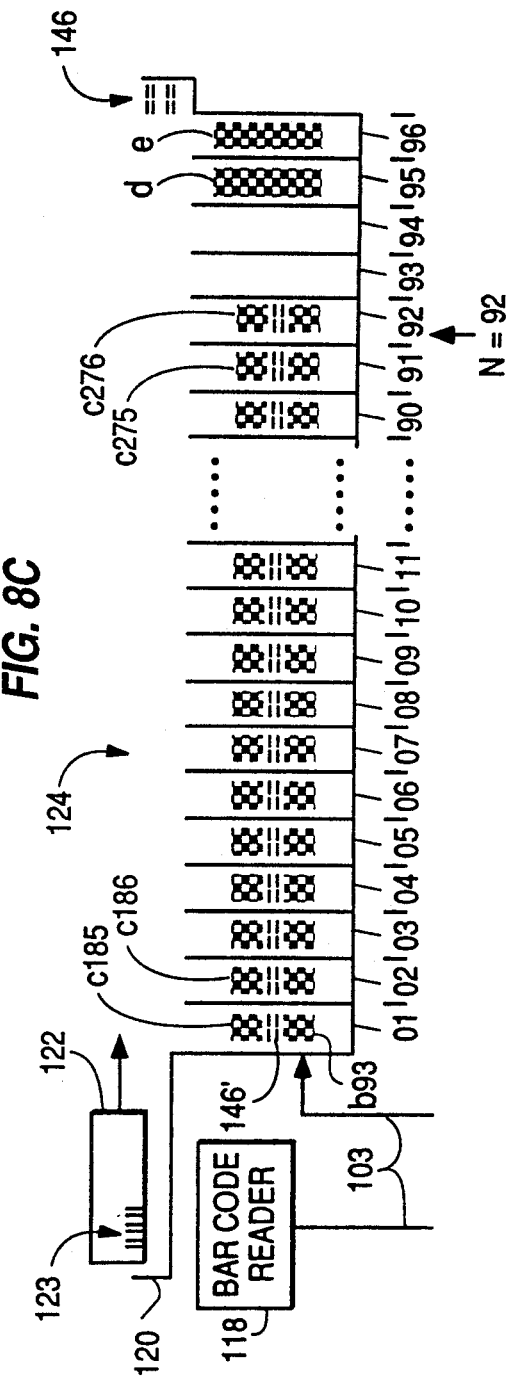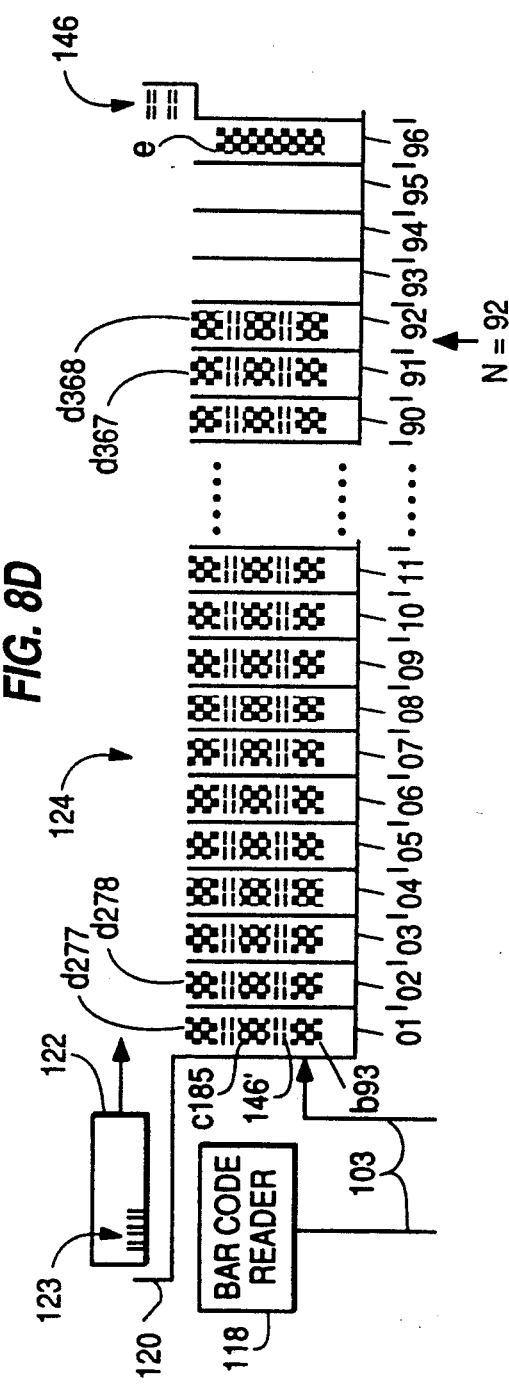

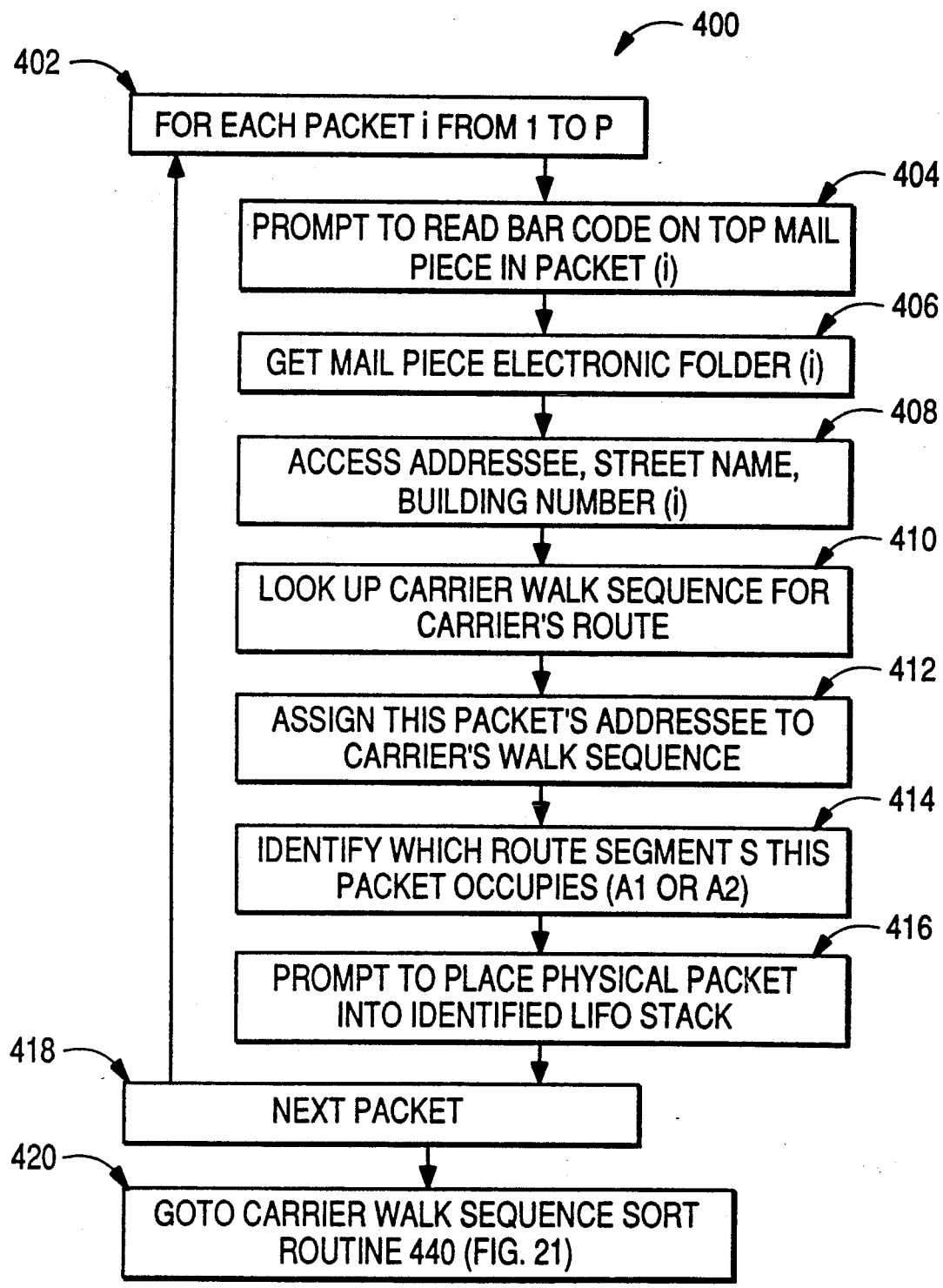

| PACKET | ADDRESS IN ROUTE FOR CARRIER Ca |
|---|---|
| 15 | 11 MAIN ST (START OF SEGMENT A1) |
| 85 | 22 MAIN ST |
| 16 | 33 MAIN ST |
| 35 | 44 MAIN ST |
| 17 | 45 MAIN ST |
| 34 | 46 MAIN ST |
| 18 | 47 MAIN ST |
| 44 | 58 MAIN ST |
| 19 | 59 MAIN ST (START OF SEGMENT A2) |
| 54 | 60 MAIN ST |
| 20 | 61 MAIN ST |
| 53 | 62 MAIN ST |
| 21 | 73 MAIN ST |
| 43 | 84 MAIN ST |
| 22 | 85 MAIN ST |
| 33 | 96 MAIN ST (END) |

430

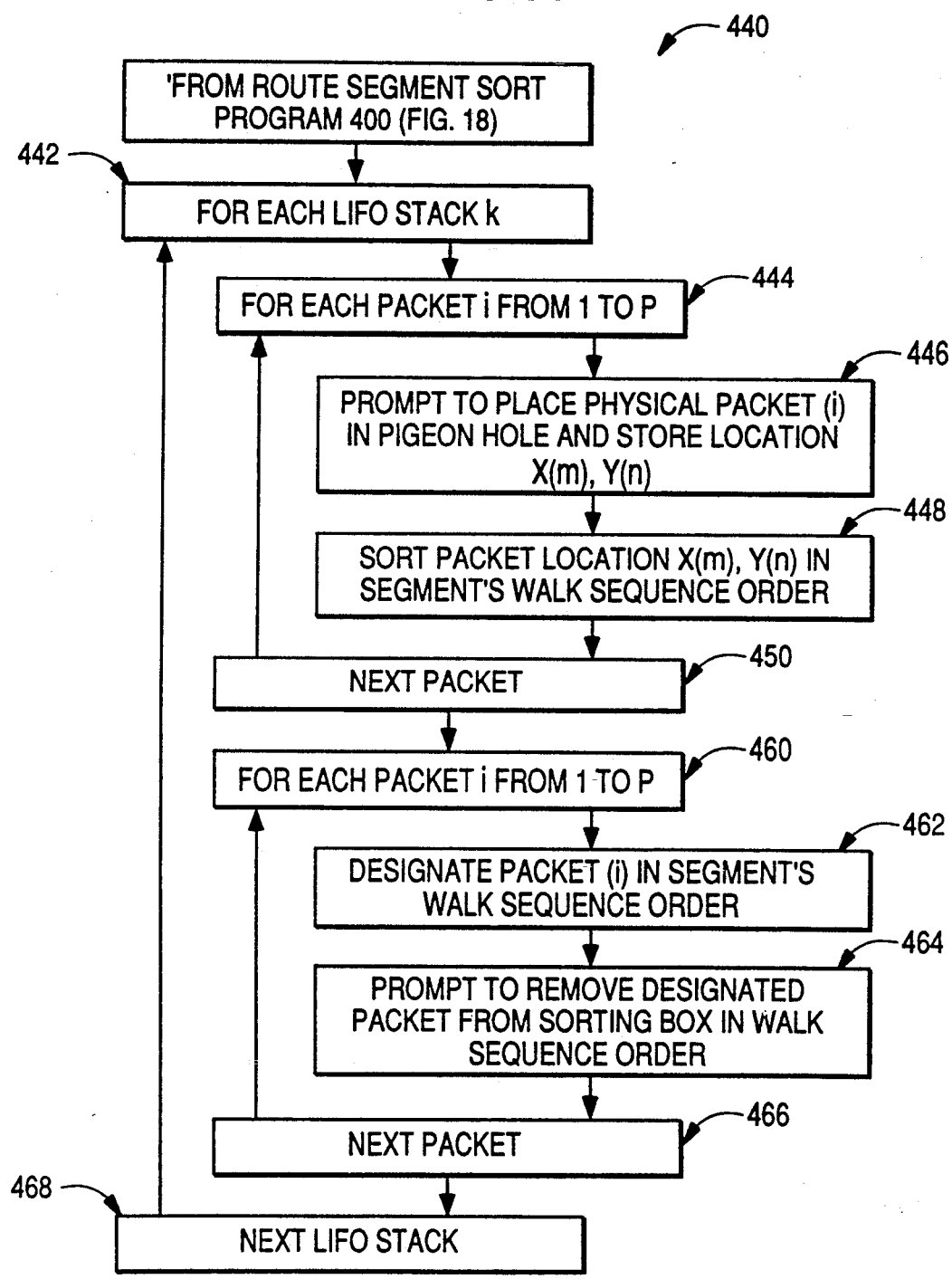

Fig. 22

Inserting packets from LIFO stack A1 into sorting box, with each pigeon hole being related to each packet.

480

|      | X(1) | X(2) | X(3) | X(4) |
|------|------|------|------|------|
| Y(1) | a34  | a18  | a44  | a16  |
| Y(2) | a35  | a17  | a15  | a85  |

Fig. 23

Designating first pigeon hole in sorting box holding first addressee in walk sequence of segment A1. Carrier removes first packet.

480

|      | X(1) | X(2) | X(3)  | X(4) |
|------|------|------|-------|------|
| Y(1) | a34  | a18  | a44   | a16  |
| Y(2) | a35  | a17  | [a15] | a85  |

X(3)Y(2) is First

Fig. 24

Designating second pigeon hole in sorting box holding second addressee in walk sequence of segment A1. Carrier removes second packet.

480

|      | X(1) | X(2) | X(3) | X(4)  |
|------|------|------|------|-------|
| Y(1) | a34  | a18  | a44  | a16   |
| Y(2) | a35  | a17  | a15  | [a85] |

X(4)Y(2) is Second

Segment A1
Mail Pieces Sorted
by Walk Sequence

500

| a15 | 11 Main St (start segment A1) |
| a85 | 22 Main St |
| a16 | 33 Main St |
| a35 | 44 Main St |
| a17 | 45 Main St |
| a34 | 46 Main St |
| a18 | 47 Main St |
| a44 | 58 Main St (end segment A1) |

Fig. 26

Segment A2
Mail Pieces Sorted
by Walk Sequence

502

| a19 | 59 Main St (start segment A2) |
| a54 | 60 Main St |
| a20 | 61 Main St |
| a53 | 62 Main St |
| a21 | 73 Main St |
| a43 | 84 Main St |
| a22 | 85 Main St |
| a33 | 96 Main St (end segment A2) |

Carrier Cb's Route
Mail Pieces Sorted
by Walk Sequence

552

| | | |
|---|---|---|
| a25 | 1 | Oak St (start carrier Cb's Route) |
| a6 | 2 | Oak St |
| a26 | 3 | Oak St |
| a7 | 4 | Oak St |
| a27 | 5 | Oak St |
| a55 | 6 | Oak St |
| a28 | 7 | Oak St |
| a9 | 8 | Oak St |
| a29 | 9 | Oak St |
| a10 | 10 | Oak St |
| a30 | 11 | Oak St |
| a11 | 12 | Oak St |
| a31 | 13 | Oak St |
| a12 | 14 | Oak St |
| a32 | 15 | Oak St |
| a13 | 16 | Oak St (end carrier Cb's route) |

Sorted Packets by Carrier Walk Sequence

DATA PROCESSING SYSTEM FOR OPTIMIZED MAIL PIECE SORTING AND MAPPING TO CARRIER WALK SEQUENCE USING REAL TIME STATISTICAL DATA

BACKGROUND OF THE INVENTION

1. Technical Field

The invention disclosed broadly relates to automated mail processing and more particularly relates to the use of real time mail volume statistics obtained prior to sorting operations at the destination postal region.

2. Background Information

U.S. Pat. No. 5,031,223, entitled "System and Method for Deferred Processing of OCR Scanned Mail" by Walter S. Rosenbaum, et al., assigned to the IBM Corporation and incorporated herein by reference, describes the compilation of statistics indicating the volume of mail pieces directed to particular addressees and destination postal regions. The Rosenbaum, et al. patent describes that such statistics may be used to allocate postal resources at particular destination postal regions to accommodate large volume mail directed to particular addressees.

What is needed in the prior art is an improved means for optimizing the sorting of mail at a destination postal region and the mapping of the mail down to carrier walk sequence, based upon the anticipated pattern of mail volumes to the recipients in that destination region.

OBJECTS OF THE INVENTION

It is therefore an object of the invention to provide an improved technique for processing OCR scanned mail.

It is another object of the invention to provide improved technique for sorting mail at a destination postal region.

It is another object of the invention to provide an improved technique for sorting mail and mapping it down to carrier walk sequence using real time statistical data.

It is still a further object of the invention to provide improved technique for sorting mail at a destination postal region using compiled statistics for the volumes of mail being directed to particular recipients at the destination region.

SUMMARY OF THE INVENTION

These and other objects, features and advantages of the invention are disclosed herein. A data processing system, method and program are disclosed to optimize mail piece sorting and the mapping of mail down to the carrier walk sequence using real time statistical data. The invention makes use of techniques such as deferred processing of OCR scanned mail, to accumulate volume statistics indicating the number of mail pieces being routed to particular addressees at a destination postal region on a given day. Such data can be originated at sending locations using either sufficiently fast OCR devices or deferred processing of OCR scanned mail. In accordance with the invention, the information for mail volumes being directed to a particular postal region are collected over data communications links prior to the receipt of the actual mail pieces. In accordance with the invention, the efficiency of sorting is maximized at the destination postal region by organizing the sorting apparatus to remove the highest volume addressee's mail first. This requires the compilation of the real time volume statistics from all of the sending postal regions sending mail to the destination postal location. In this manner, the maximum number of letters on every pass through the sorting apparatus can be achieved at the destination location. This minimizes the total number of reading operations required in order to achieve a desired level of mail sorting separation. Because the mail volume statistics are available at the destination location prior to sorting, at each stage of the sorting operations, bin allocation can be customized to yield the highest final addressee sort. In this manner, the time for every subsequent pass through the sorting apparatus is reduced. This enables sorting directly to the addressee level and the distribution of the mail down to carrier walk sequence.

DESCRIPTION OF THE FIGURES

These and other objects, features and advantages of the invention will be more fully appreciated with reference to the accompanying figures.

FIG. 4A illustrates the identification number and the corresponding bar code for a mail piece La.

FIG. 4B illustrates the identification number and the corresponding bar code for a mail piece Le.

FIG. 4C illustrates the identification number and the corresponding bar code for a mail piece Li.

FIG. 7 shows a series of five flow diagrams, FIG. 7A, FIG. 7B, FIG. 7C, FIG. 7D and FIG. 7E.

FIG. 7A is a flow diagram of the computer routine to sort letters by addressee volume.

FIG. 8C illustrates the sorting of the third pass addresses 2N+1 to 3N by volume into packets.

FIG. 8D illustrates the sorting of the fourth pass addresses 3N+1 to 4N by volume into packets.

FIG. 11 illustrates the carrier assignment route table 300.

FIG. 12 illustrates a flow diagram of the computer routine to sort packets by carrier 310.

FIG. 15 is a diagram of the carrier sorting case.

FIG. 18 is a flow diagram of the computer routine to sort random ordered packets assigned to a carrier into route segments.

FIG. 21 is a flow diagram of a routine to sort packets in route segments into carrier walk sequence.

FIG. 22 illustrates the insertion of packets from a LIFO stack into a sorting case.

FIG. 23 illustrates the designation of a first pigeon hole in the sorting case holding a first addressee in the walk sequence of a first segment.

FIG. 24 illustrates the designation of a second pigeon hole in the sorting case holding a second addressee in the walk sequence of a segment.

FIG. 26 illustrates the arrangement of mail pieces sorted by walk sequence in a second segment.

DISCUSSION OF THE PREFERRED EMBODIMENT

Figure 1:
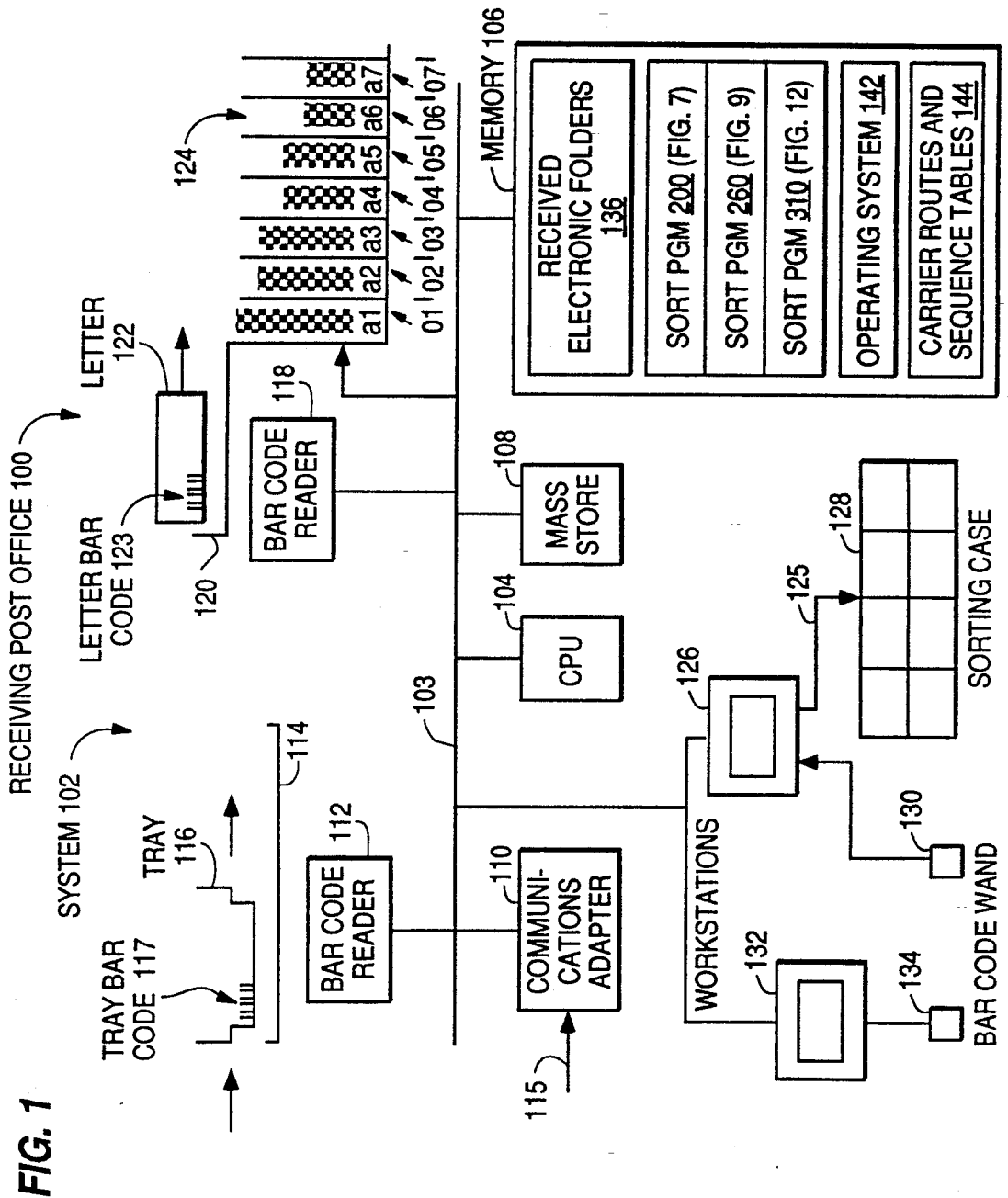
FIG. 1 is a system block diagram of the data processing system at the receiving post office.
Figure 2:
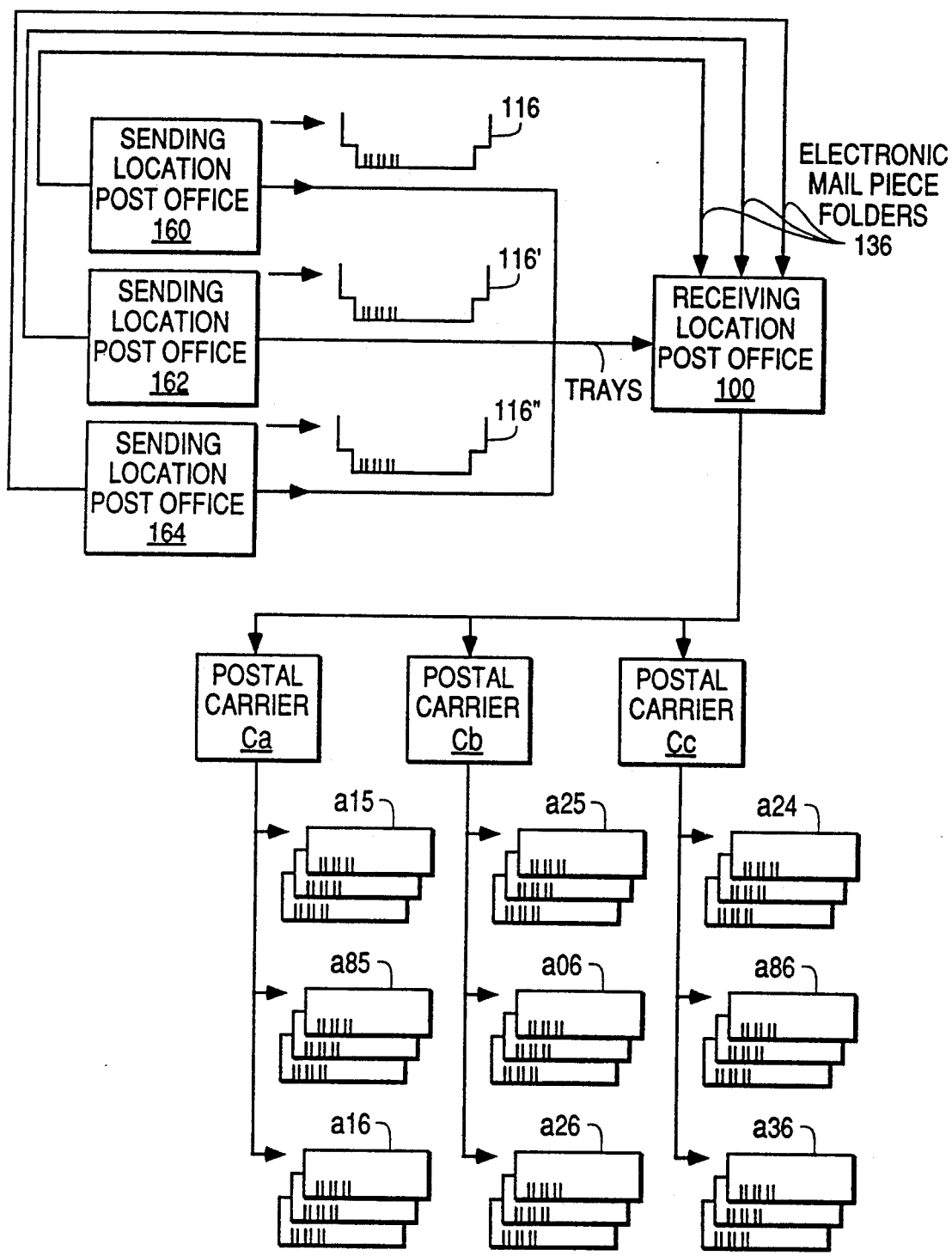
FIG. 2 is a diagram illustrating the delivery of electronic mail piece folders and the delivery of mail pieces to a destination post office from a plurality of sending post offices.

FIG. 1 is an overall system block diagram of the data processing system 102 at the receiving post office 100, to process mail pieces in a optimized manner down to carrier walk sequence. System 102 has the CPU 104 connected by means of the bus 103 to the bar code reader 112, the communications adapter 110, the mass store 108, the bar code reader 118, the sorter apparatus 124, the memory 106, and the workstations 126 and 132. The bar code wand 134 is connected to workstation 132 and the bar code wand 130 is connected to the workstation 126. The sorting case 128 is connected by connection 125 to the workstation 126. The communications adapter 115 is connected to a data processing network to receive electronic mail piece folders 136 from sending post office 160, 162 and 164, as is shown in FIG. 2. The tray 116 on conveyor 114 passes its bar code 117 by the bar code reader 112. The bar code reader 112 reads the bar code reader 112 reads the bar code 117 on a mail tray 116 carrying mail pieces arriving from destination post offices. Among those mail pieces is the letter 122 which has a bar code 123 which is read by the bar code reader 118 when it passes on the conveyor 112. The sorting apparatus 124 includes the sorting pockets 01' through 07' which serve to receive letters in the mail packets al through a7, shown in FIG. 1. The memory 106 includes a partition for storing received electronic folders 136, another partition to store the sorting program 200, shown in detail in FIG. 7, the sorting program 260, shown in detail in FIG. 9, and the sorting program 310, shown in detail in FIG. 12. The memory 106 also includes a partition for storing the operating system 142 and a partition 144 for storing the carrier routes and sequence tables.

FIG. 2 illustrates the passage of electronic mail piece folders 136 from sending location post offices 160, 162 and 164 to the receiving post office location 100. Also, the mail trays 116, 116' and 116" are sent from the sending post offices 160, 162 and 164, respectively, to the receiving post office 100. In accordance with the invention, the data processing of the information in the electronic mail piece folders 136 enables the efficient sorting and mapping of the mail pieces contained in the trays 116, 116' and 116" down to carrier walk sequence for the postal carrier's Ca, Cb, and Cc in the destination postal location. The carrier Ca will be able to efficiently sort the packets a15, a85 and a16 in carrier walk sequence. The postal carrier Cb will be able to efficiently sort the packets a25, a06 and a26 in carrier walk sequence. The postal carrier Cc will be able to efficiently sort the packets a24, a86 and a36 down to carrier walk sequence.

Figures 3, 5C, 5D:
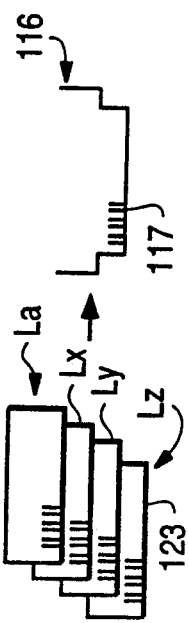
FIG. 3 illustrates the identification numbers 123' assigned to mail pieces at a sending location.
FIG. 5C illustrates the packaging of New York mail to Akron in the tray 116.
FIG. 5D illustrates the tray bar code 117, which is an optional means for identifying the tray and relating it to the mail contained in it.

FIG. 3 shows how the ID numbers 123', which are converted into the letter bar codes 123, are organized at the sending locations. In accordance with the above cited Rosenbaum, et al. patent, the front of each mail piece has its image captured and the address data in the image recognized while the mail piece is in route to its destination location. The bar code 123 which is placed on the mail piece at the sending location results from the ID number 123' which has the fields shown in FIG. 3. This organization for an ID number 123' is one example of a suitable identification number for the deferred processing of OCR scanned mail. Other formats for the ID number 123' are also possible. In FIG. 3, a first field is used to identify the sending post office. A second field is used to identify the day of the year. This day field could also be the day of the week, since normally mail will be cleared out of the system within one week's duration. A third field will indicate the working shift for the workers at the sending location. The fourth field is the hour for the processing of the mail piece at the sending location. The fifth field is the minute for the processing of the mail piece at the sending location. Another field is the second field which is when the mail piece was processed at the sending location. Another field is the 1/10 second field which is the instant at which the mail piece was processed at the sending location. The resulting ID numbers 123' for nine mail pieces La through Li are shown in FIG. 3.

FIG. 4A shows how the mail piece La has its ID number 123' converted into the ID bar code 123. Correspondingly, FIG. 4B shows how the mail piece Le has its ID number 123' converted into the ID bar code 123. Similarly, in FIG. 4C, it is shown how the mail piece Li has its ID number 123' converted into the ID bar code 123.

Figure 5A:
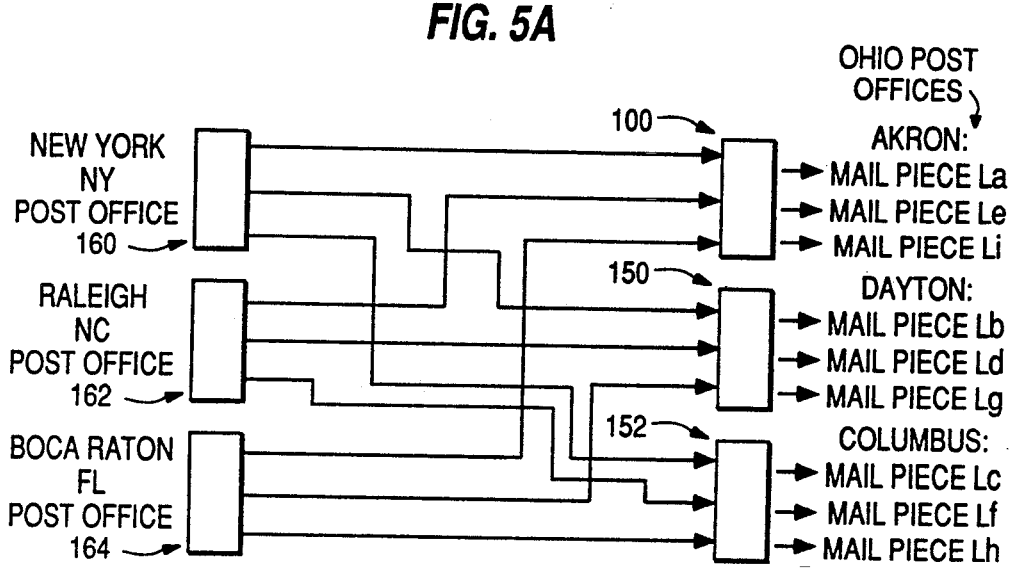
FIG. 5A illustrates the routing of nine mail pieces between three sending post offices and three receiving post offices.

FIG. 5A shows the routing paths for nine mail pieces routed from three sending post offices, 160, 162 and 164, to three receiving post offices, 100, 150 and 152. The receiving post office of interest in the examples herein is the Akron Post Office 100, which will receive mail piece La from post office 160, it will receive mail piece Le from sending post office 162 and it will receive mail piece Li from sending post office 164.

Figure 5B:
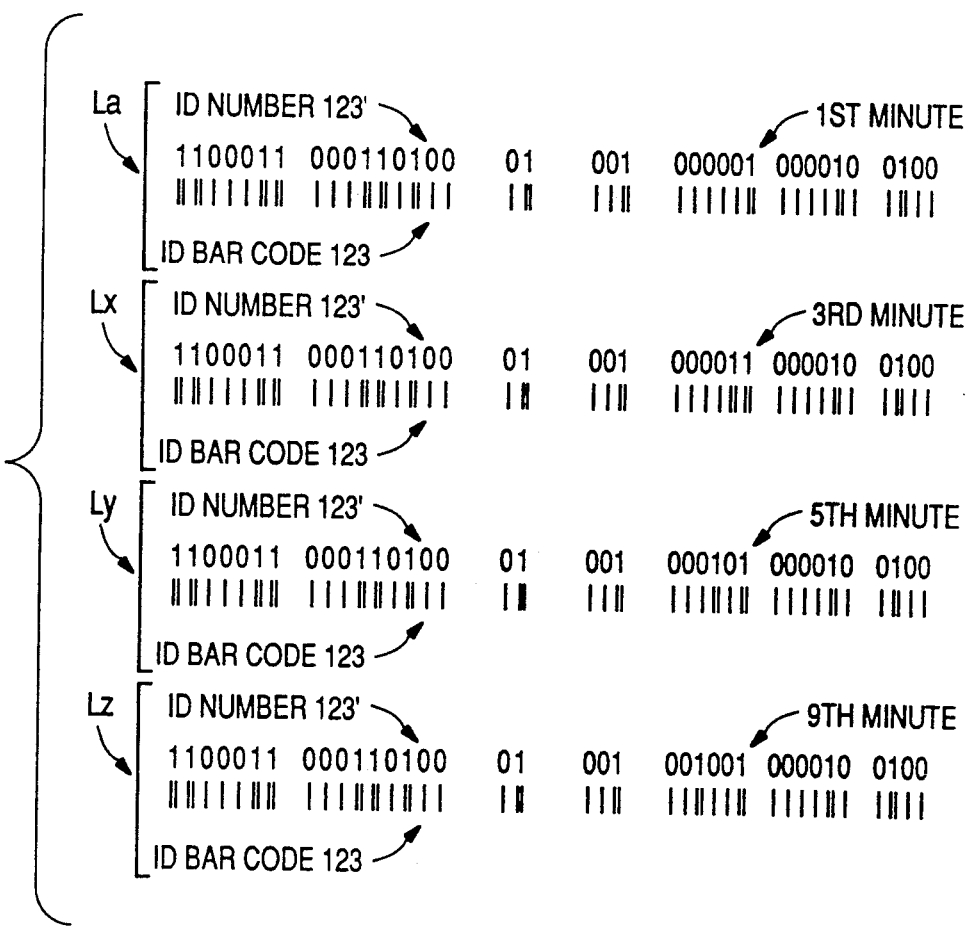
FIG. 5B illustrates the identification number and corresponding bar code for four mail pieces directed from the New York Post Office to the Akron Post Office for mail pieces La, Lx, Ly and Lz.

FIG. 5B illustrates the ID number 123' and the corresponding ID bar code 123 for four different mail pieces sent from the New York sending post office 160 to the Akron receiving post office 100, namely mail piece La, Lx, Ly, and Lz. Note that the difference in the ID number 123' for each of the four mail pieces is in the minute field for the processing of the mail piece at the sending location 160. It is seen that the mail piece La was processed during the first minute, the mail piece Lx was processed in the third minute, the mail piece Li was processed in the fifth minute and the mail piece Lz was processed in the ninth minute at the sending location 160.

FIG. 5C illustrates the packaging of the mail pieces La, Lx, Ly, and Lz at the sending post office 160 into a mail tray 116 bearing a mail tray bar code 117.

FIG. 5D illustrates the mail tray bar code 117. The mail tray bar code 117 comprises portions indicating the sending post office, the day of processing and the shift of processing at the sending post office. Also included in the bar code 117, is information on the time of processing for the first mail piece in the tray 116 and the time of processing for the last mail piece in the tray 116. This information on the bar code 117 applied to the tray 116 enables the receiving postal data processing system to identify precisely which mail pieces are contained in the tray 116 when it is received in the destination post office. Other forms of identification for the tray 116 are also possible and the format for the tray bar code 117, as shown in FIG. 5D, is optional.

Figure 6A:
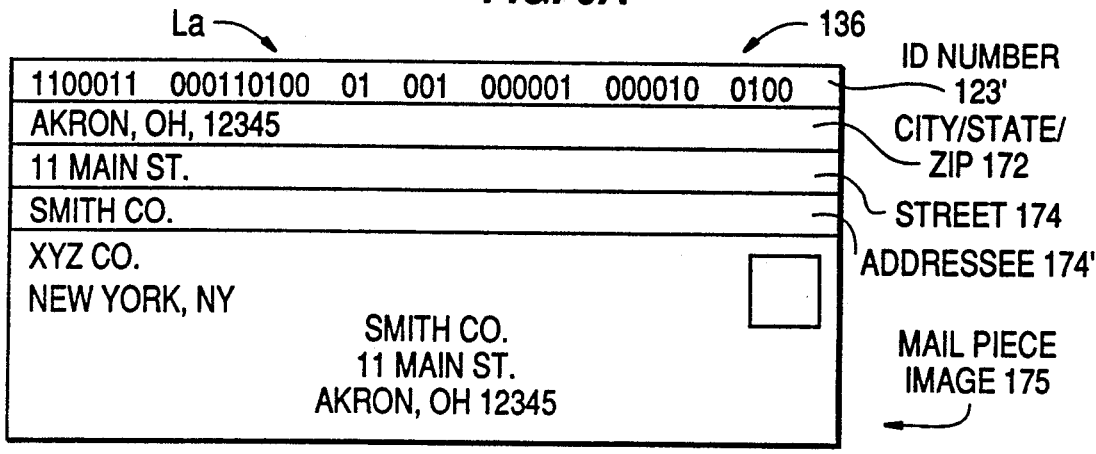
FIG. 6A illustrates the mail piece electronic folder for the mail piece La.
Figure 6B:
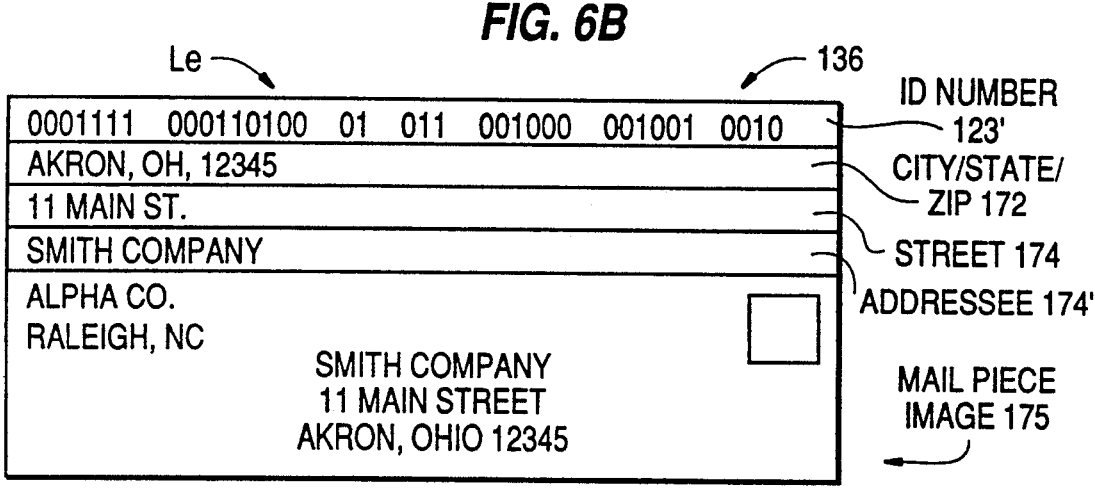
FIG. 6B illustrates the mail piece electronic folder for the mail piece Le.
Figure 6C:
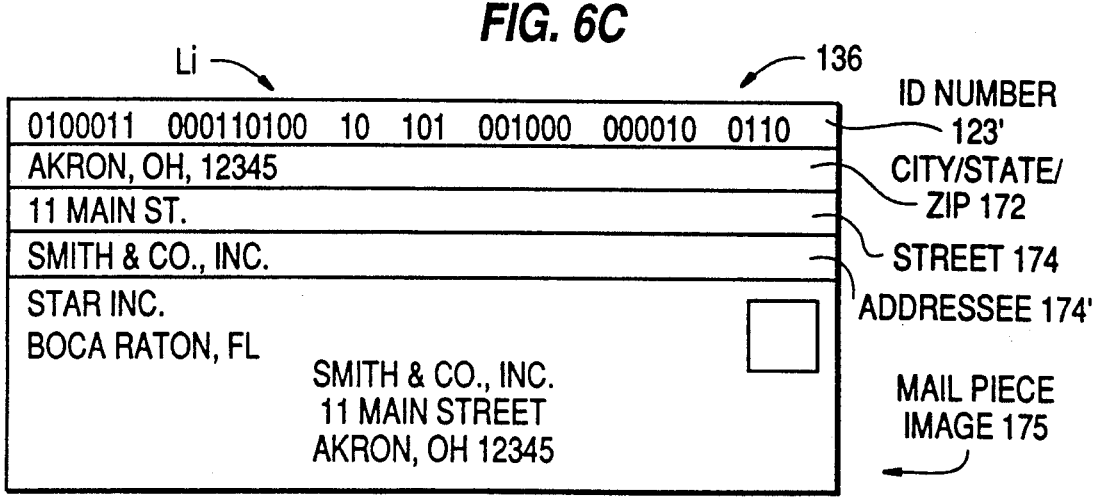
FIG. 6C illustrates the mail piece electronic folder for the mail piece Li.

FIG. 6A illustrates the mail piece electronic folder for the mail piece La 136. The electronic folder 136 includes the ID number 123' for the mail piece La, the recognized city, state and zip code 172, the street name and number 174, the addressee name 174', and it may optionally also include the mail piece image 175. FIG. 6B illustrates the mail piece electronic folder 136 for the mail piece Le. FIG. 6C illustrates the mail piece electronic folder 136 for the mail piece Li.

FIG. 7A illustrates a flow diagram of the computer routine 200 to sort letters by addressee volume. This program is stored in the memory 106 of the system 102, shown in FIG. 1. The instructions in the program are executed by the CPU 104. The first step 202 receives and stores mail piece electronic folders 136, received over the communications link 115. Step 203 reads the bar codes 117 on the arriving mail trays 116, using the bar code reader 112 for the trays 116 on the conveyor 114. Step 204 accesses the electronic folders 136 from the memory 106 for all mail pieces 122 identified by the tray bar code 117 as being contained in the tray 116. Many trays 116 may be simultaneously processed by routine 200.

In step 205, for each electronic mail piece folder, a loop starts. In step 206, the addressee, street name and street number and the building number are accessed from the electronic mail piece folder 136. In step 207, the addressee count Ad is incremented by 1. Then in step 208, the loop continues returning to step 205, until all mail pieces have been processed which have been received that day at the receiving post office 100.

In step 209, the sort order is computed by the addressee volume from the highest volume addressee receiving mail to the lowest volume addressee receiving mail at the destination post office 100. Then in step 210, Table 1 is constructed, which is a volume ordered table for the first through the fourth sorting passes. In addition, Table 2 is constructed, which is a volume ordered addressee table for the last sorting pass, listing the addressee number Ad in one column and the corresponding volume V(Ad) in a second column.

Figure 8A:
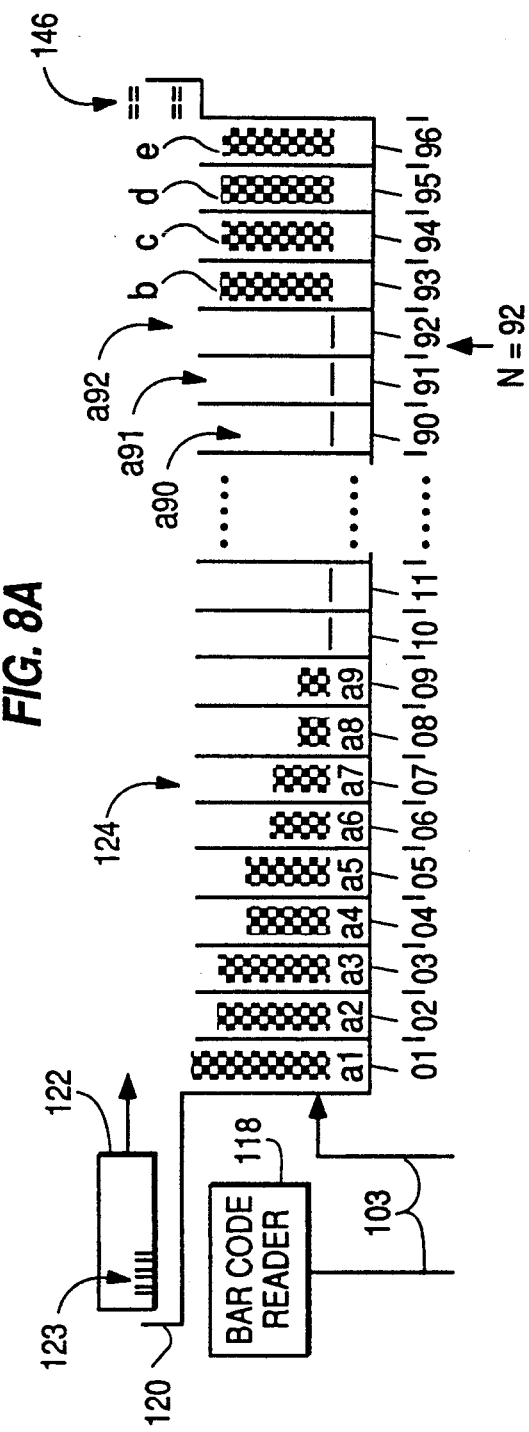
FIG. 8A illustrates the sorting of the first pass N+4 addresses by volume into packets.

Then in step 211, a first pass of N+4 pockets is performed. Reference should be made to FIG. 8A which shows the sorting of the first pass N+4 addressees by volume into packets a1 through a92 and b, c, d, and e. This constitutes 92 individual addressees, a1 to a92, for the first 92 pockets, and an additional four pockets containing the second, third, fourth and fifth pass mail pieces. The N first highest volume addressees are assigned to the first N pockets, 1 through 92. In step 212, a loop starts for the variable I from 1 to N. Then, in step 213, the addressee (I) is assigned to the pocket (I). In step 214, the next value for I is incremented and the loop passes back to step 212. This generates the addressee assignments for the first 92 pockets of the sorter 124 shown in FIG. 8A.

In step 216, the N+1st, or 93rd pocket, gets the next N second highest addressees, from b93 to b184. This second pass assignment loop starts at step 217 with a variable I from 1 to N and then in step 218, the addressee (N+I) is assigned to the pocket (N+1), or the 93rd pocket. In step 219, the next value of I is incremented and the loop passes back to step 217. In this manner, 92 additional addressees are assigned to the 93rd pocket in the sorter 124 of FIG. 8A.

Then, in step 220, the N+2nd, or the 94th pocket, is assigned the next N third highest addressees from c185 to c276. The assignment starts at step 221 with the loop for the variable I from 1 to N. Then, in step 222, addressees (2N+I) are assigned to the pocket (N+2), or the pocket 95'. Then in step 223, the next value of the variable I is incremented and the loop returns to stop 221. In this manner, 92 additional addressees are assigned to the 95th pocket.

In a similar manner, in step 225, the N+3rd pocket is assigned the next N fourth highest addressees.

And last, in step 226, the N+4th pocket, or the 96th pocket of the sorter of 124 is assigned the remaining addressees from the 369th to the last addressee.

Then in step 228, a signal is transmitted to the sorting apparatus 124 to start the first pass for the entire batch of mail pieces which are to be sorted into the 96 pockets of the sorter 124. Then the step 229, the program flow goes to step 230 which can be seen in the routine in FIG. 7B.

Reference to Tables 1 and 2 shows that the first through fourth sorting passes have the addressees ordered by their respective mail piece volumes in a monotonically descending order In the example shown in Tables 1 and 2, the receiving post office 100 has 6,000 postal patrons, of whom 5,000 are addressees who are receiving mail on the day of the example. A total of 50,000 mail pieces is received during the course of the day at the post office 100. A typical distribution for mail pieces conforms to the 80:20 rule where 80% of the mail is received by 20% of the postal patrons. This rough figure for typical distribution of mail pieces is reflected in the distribution of volumes shown for the 5,000 addressees listed in Tables 1 and 2. During the first pass of 92 addressees, typically 36,000 mail pieces will be sorted out if the principle of the invention is applied, namely preferentially sorting the highest volume addressees first. During the second pass of the next 92 addressees, approximately 1,800 mail pieces will be sorted. During the third pass of the next 92 addressees, approximately 1,600 mail pieces will be sorted. During the fourth pass of the next 92 addressees, another approximately 1,400 mail pieces will be sorted. The fifth pass for the 369th through 5,000th addressees will have 10,000 remaining mail pieces sorted into the 96th pocket of the sorter of 124, in this example.

Figure 7B:
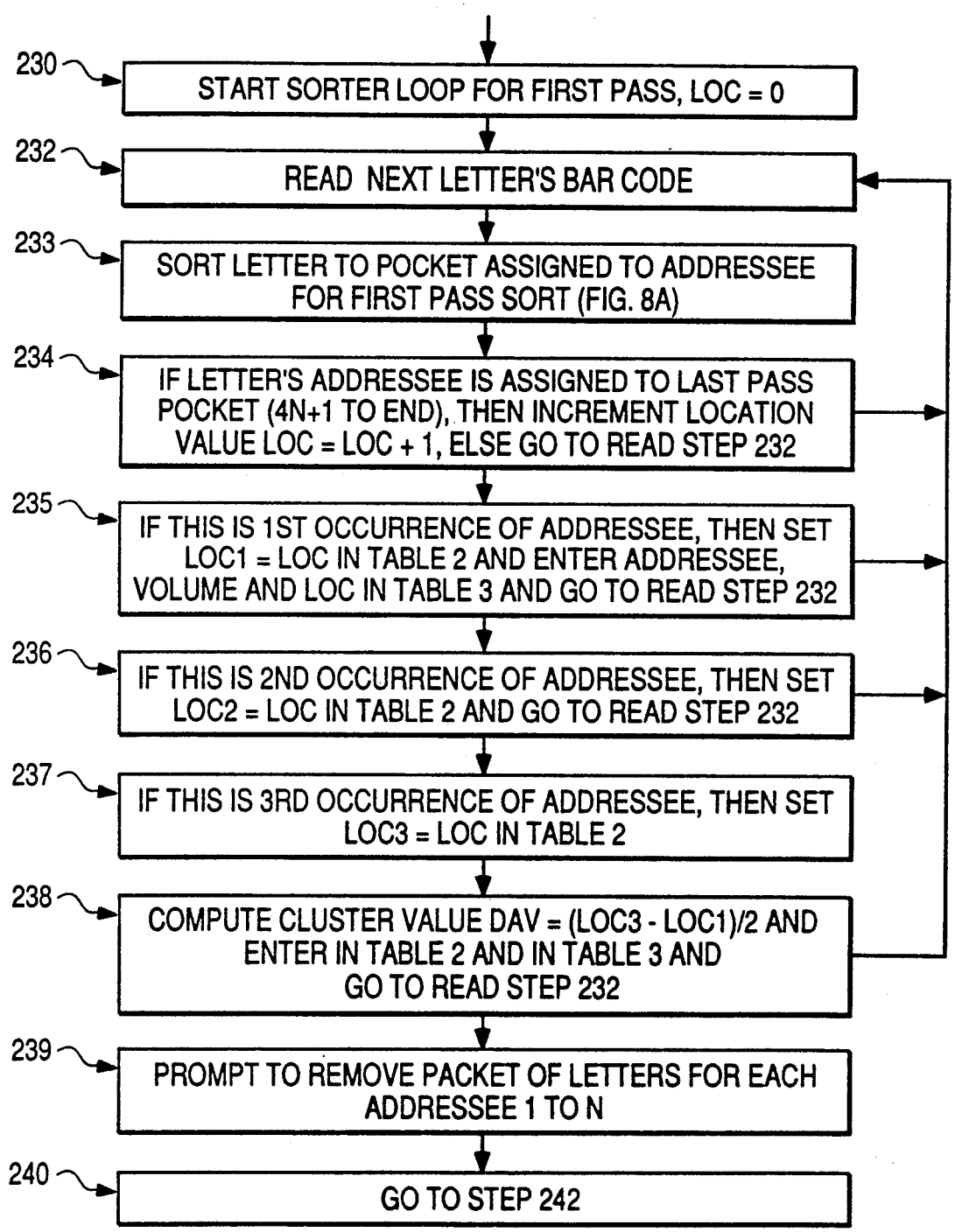
FIG. 7B is a flow diagram of the computer routine to construct Tables 2 and 3 for last pass processing.

The flow diagram of FIG. 7B illustrates the routine to construct Tables 2 and 3 for the last pass processing. This occurs during the first pass sorting with the sorter 124 of FIG. 8A. The routine of 7B starts at step 230, which starts the sorter loop for the first pass and sets the variable LOC=0. Then in step 232, the next letter 122 has its bar code 123 read by the bar code reader 118. Then in step 233, the letter 122 is sorted by the sorting apparatus 124 into its assigned pocket for the addressee represented by the bar code 123 in this first pass sort. Refer to FIG. 8A for the sorting operation. Then in step 234, if the letter's addressee is assigned to the last pass pocket 96, that is if the addressee is from 4N+1 to the end, or from number e369 to e5,000, then increment LOC by 1. Otherwise, return to step 232. In step 235, if this addressee has been assigned to the last pass pocket, and if this is the first occurrence of this addressee in the sorting operation, then set the value of LOC equal to the first location LOC1 for this addressee's mail pieces in the stack of mail pieces being sorted into the pocket 96. In addition, the addressee number Ad, the corresponding mail volume, and the value for LOC1 are entered in Table 3. Then the flow returns to the read step 232. In step 236, if, in the alternative, this is the second occurrence of the addressee in the sorting operation, then the value LOC is set =LOC2 in Table 2 and the flow returns to the read step 232. Then in step 237, in the alternative if this is the third occurrence of the addressee, then LOC3 is set = LOC in Table 2 and the flow proceeds to step 238 which computes the cluster value Dav which is equal to the average difference between LOC2 and LOC3 and between LOC1 and LOC2. This average difference is set equal to Dav and is entered into Table 2 and Table 3. The flow then proceeds to step 232. After all mail pieces are processed for all of the N+4 pockets of the sorter 124, step 239 prompts the operator to remove each packet of letters for each of the 92 pockets 1 to N. Then the flow proceeds to step 240 which goes to step 242 in FIG. 7C.

Figure 7C:
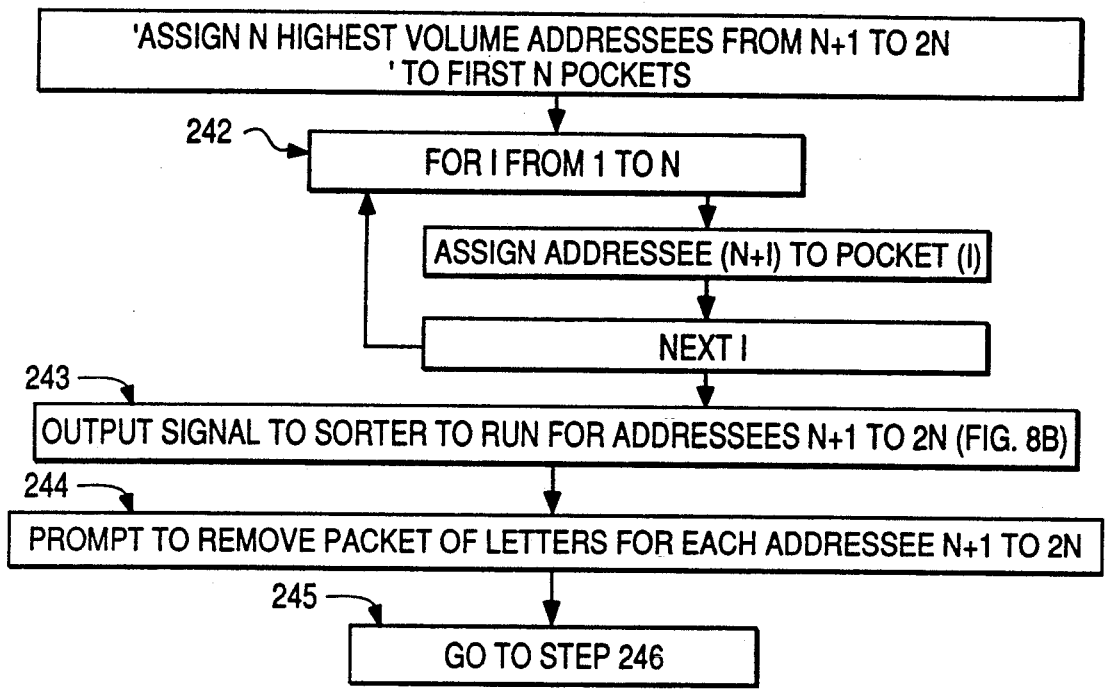
FIG. 7C is a flow diagram of the routine to sort the second pass of N pockets for addressees N+1 to 2N.

FIG. 7C is a flow diagram of the routine to sort the second pass of N pockets for the addressees N+1 to 2N, or, from b93 to b184. The N highest volume addressees from N+1 to 2N are assigned to the first N pockets. In step 242, a loop starts for I from 1 to N which assigns the addressee (N+I) to the pocket I (I), and then the loop continues N times. In step 243, an output signal is sent to the sorter 124 to run for the addressees N+1 to 2N, as is shown in FIG. 8B. Then in step 244, a prompt is given to the operator to remove the packets of letters for each of the addressees N+1 to 2N, that is, the 92 packets from addressee b93 through addressee b184. In the alternative, those packets can be left in the pockets of the sorter 124 if there is sufficient remaining room to sort the third pass letters on top of the second pass letters. This is shown in FIG. 8C where separator cards 146' are automatically introduced from the separator card holder 146 in the sorter 124. Then in step 245, the flow goes to step 246 of FIG. 7D.

Figure 7D:
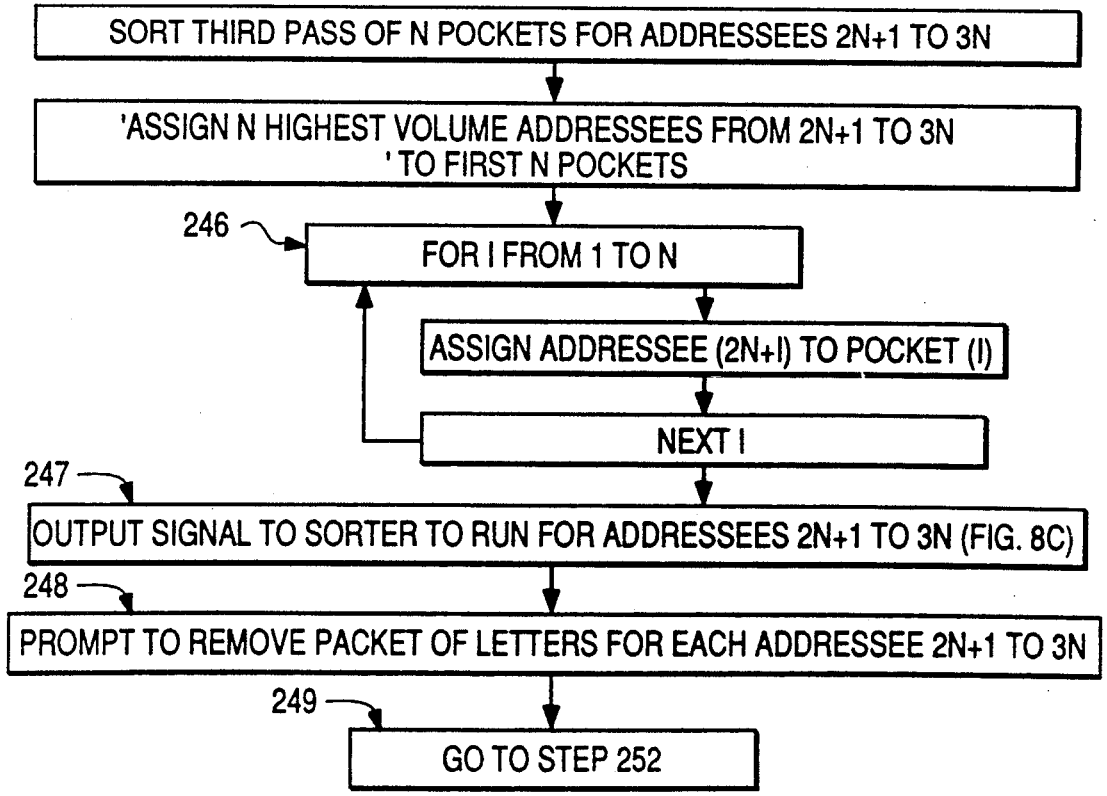
FIG. 7D is a flow diagram of the routine to sort the third pass of N pockets for addresses 2N+1 to 3N.

FIG. 7D is a flow diagram of the third pass sort of N pockets for addressees 2N+1 to 3N. Step 246 starts the loop which assigns the addressees to the pockets. Step 247 outputs a signal to the sorter 124 to run for the addressees 2N+1 to 3N, that is, the addressees c185 to c276. See FIG. 8C for the sorting operation. Then, a prompt is given to the operator to remove the packets of letters. In the alternative, the packets can remain in the pockets of the sorter 124 if there is sufficient room for the next pass sort. Then in step 249, the flow goes to step 252 in FIG. 7E.

Figure 7E:
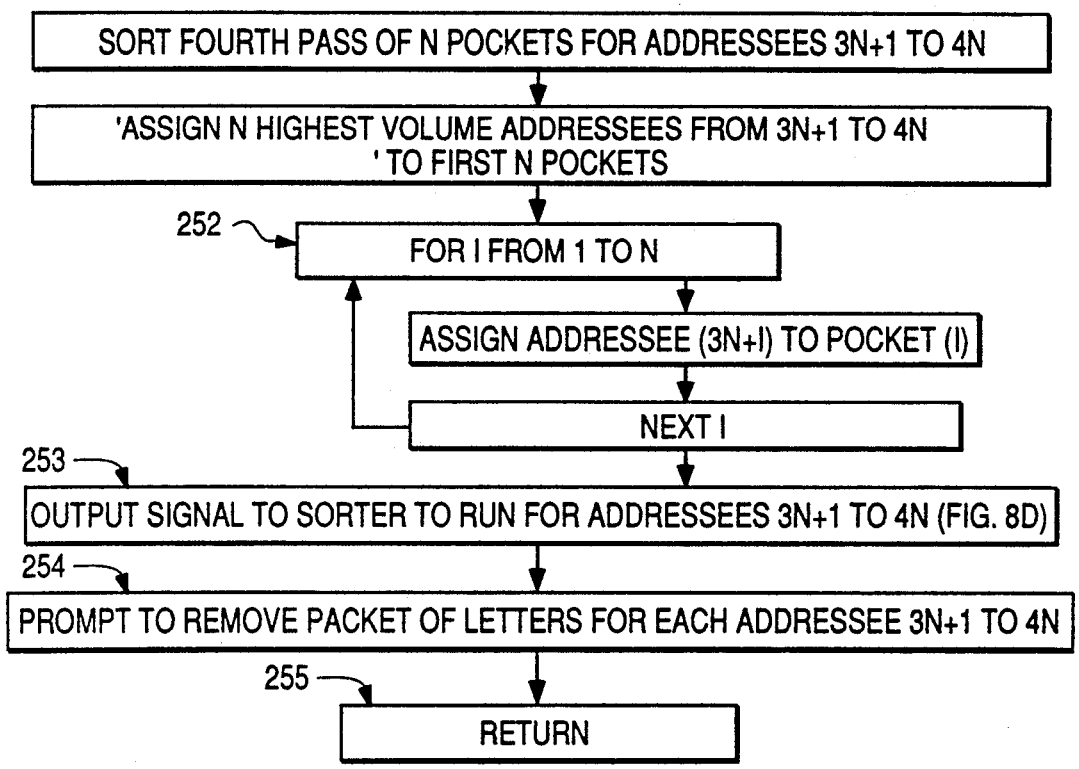
FIG. 7E is a flow diagram of the routine to sort the fourth pass of N pockets for addressees 3N+1 to 4N.
Figure 8B:
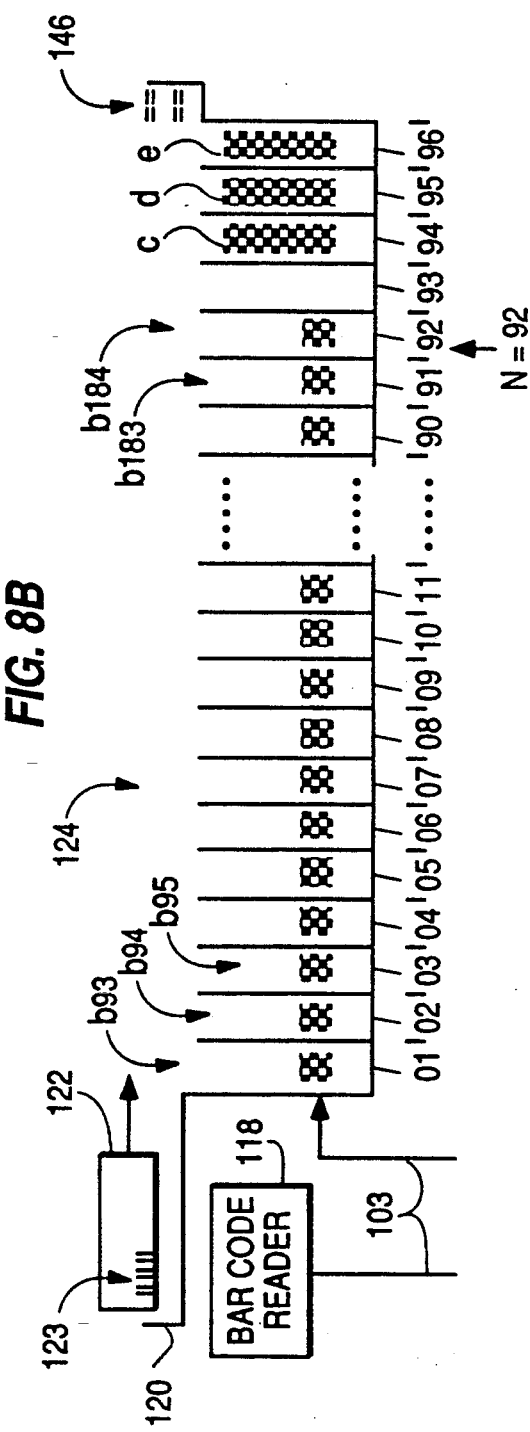
FIG. 8B illustrates the sorting of the second pass addresses N+1 to 2N by volume into packets.

FIG. 7E is the routine for sorting the 4th pass of N pockets for the addressees 3N+1 to 4N, that is, the addressees d277 to d368. In step 252, the loop starts for assigning the addressees 3N+I to the pockets I. Then, in step 253, an output signal is sent to the sorter 124 to run for the addresses 3N+1 to 4N. See FIG. 8D for this sorting operation. Then in step 254, a prompt is given to the operator to remove the packets of letters. Then in step 255, the program returns to the main program.

Figure 9:
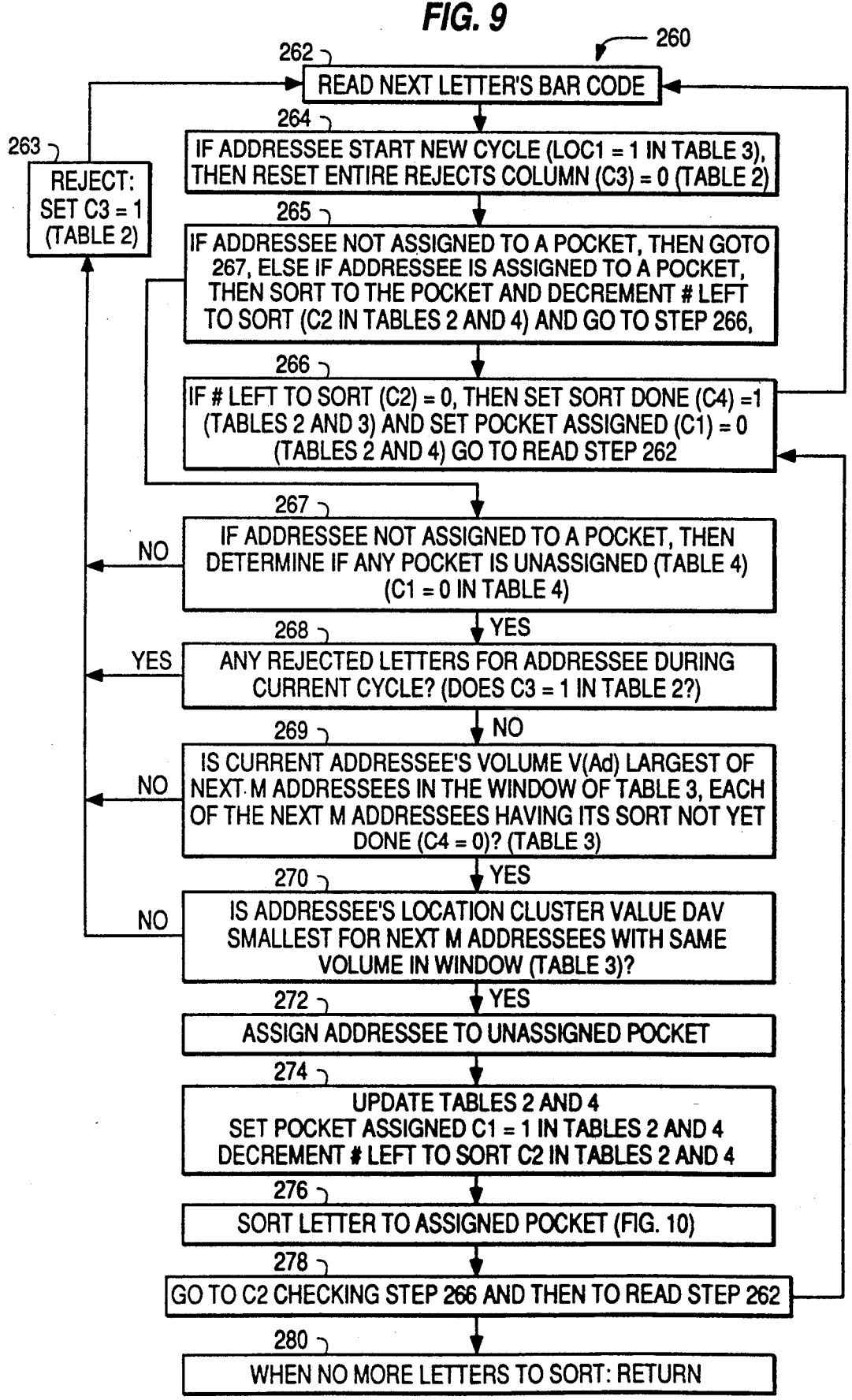
FIG. 9 illustrates a flow diagram of the last pass continuous sorting routine 260.

FIGS. 8A through 8B show the sorter 124 which sorts letters 122 by reading the bar code 123 using the bar code reader 118 near the conveyor 120. The bar code reader 118 and the sorter 124 are connected over bus 103 to the CPU 104. The progression of FIGS. 8A, 8B, 8C and 8D show the first pass, second pass, third pass and fourth pass, respectively, FIG. 9 shows the last pass continuous sorting routine 260 which is carried out by the sorter shown in FIG. 10, in conjunction with the conveyor 148. The letters 122 are continuously cycled in the sorter 124 and if rejected from one sorting pass, they are conveyed by the conveyor from the inlet 147 along the conveyor 148 back to the conveyor 120 to be read again in the next pass by the bar code reader 118. In the flow diagram of FIG. 9, the addressees for N+1 to the last, or from e369 to e5000 are continuously processed. In step 262, the next letter's bar code 123 is read by the bar code reader 118. Then in step 264, if the addressee starts a new cycle, as is shown in Table 3, then the rejects column in Table 2 is reset. In Table 3 it is seen that the addressees are organized by the location of their first appearance in the stack of mail pieces e for the fifth pass, that were accumulated from the first pass in the pocket 96'. The top mail piece in the stack e is identified as location 1 and is referred to in Table 3 as LOC 1=1. As it passes by the bar code reader 118, that event restarts the cycle. As the sorting proceeds through several cycles, eventually the addressee, in this case e3000, will be sorted out of the stream of mail pieces in the sorter 124. When that occurs, the next remaining addressee in the list of Table 3 is attributed as the addressee whose occurrence before the bar code reader 118 will restart the cycle. In FIG. 9, in step 264, if the addressee starts a new cycle, then the entire rejects column C3 in Table 2 is set=0. The flow then proceeds to step 265 where, if the addressee is not assigned to a pocket, then the flow proceeds to step 267. However, if the addressee is assigned to a pocket in step 265, then the letter is sorted to that pocket by the sorter is decremented by 1 and then the flow goes to step 266. In step 266, if the number left to sort C2 is now =0, then the sort done value C4 is set =1 in Tables 2 and 3. Also, the pocket assigned value C1 is set=0 in Tables 2 and 4. Then the flow proceeds back to the read step 262.

In the alternative, in step 267, if the addressee is not assigned to a pocket, then it is determined if any pocket is currently unassigned by inspecting Table 4 to determine if the value C1 is=0 for any pocket. If no pocket is available, then the flow proceeds to step 263 where the value of C3 is set=1 in Table 2 and the letter is rejected and sent to the conveyor 148. After step 263, the flow proceeds to step 262 to read the next letter's bar code. Alternately, in step 267 if it is determined that there is a pocket that is unassigned with a value C1=0 then the flow proceeds to step 268. In step 268 it is determined whether there are any rejected letters for the addressee which have occurred during the current cycle, by determining if C3 is=1 in Table 2. If yes, then the flow proceeds to the reject step 263. Alternately, if no letters have been rejected for this addressee during the current cycle with C3=0 then the flow proceeds to step 269. In step 269, it is determined whether the current addressee's volume V(Ad) is the largest of the next M addressees in the window of Table 3. Each of the next M addressees in the window is to have its sorting not yet completed, by determining that C4 is still=0 in Table 3. The window in Table 3 is a moving window which proceeds down the list of addressees in Table 3. The size of the window can be adjusted, and in this case spans 4 addressees, starting with the current addressee whose bar code has just been read by the bar code reader 118. In Table 3, a first window W1 is shown which brackets four consecutive rows of addressees and their corresponding volumes. The addressee with the largest volume in the window is chosen for assignment to the available pocket. In the first window, W1, although the current bar code being read is that for the addressee e3000, which is at location 1, since the window W1 is four rows wide and encompasses the addressee e370, which has a volume of 15, since this is a larger volume than that for the addressee e3000, who has a volume of 3 the sorter 124 proceeds to wait until the first occurring mail piece for the addressee e370, at location 8, passes the bar code reader 118. When this occurs, the mail piece for addressee e370 will be assigned to the available pocket and that pocket will remain assigned for the addressee e370 until all of the remaining 14 mail pieces are sorted into the available pocket.

Figure 10:
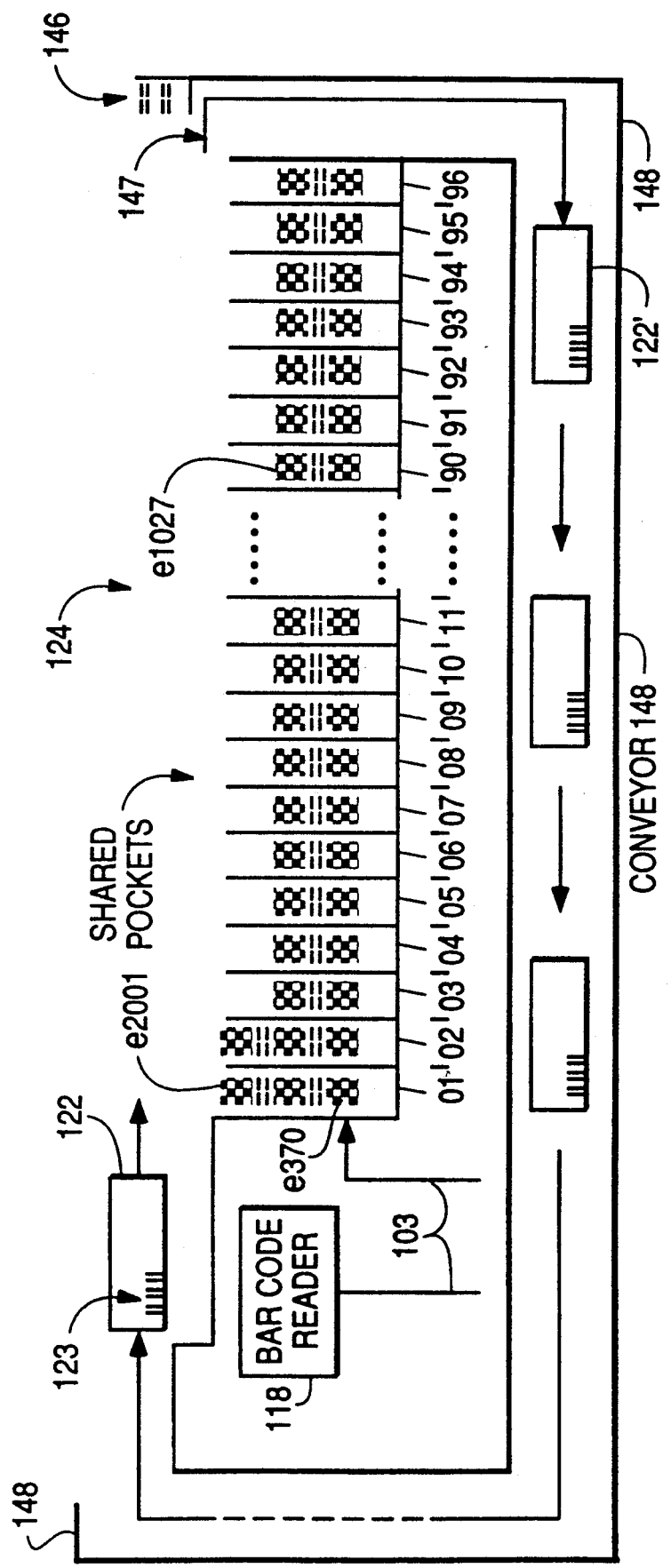
FIG. 10 illustrates the last pass continuous sorting for addresses 4N+1 to the last addressee.

Step 269 flows to step 270 where it is determined if the addressee's location cluster value Dav and is the smallest for the next M addressees with the same volume in the window of Table 3. This step is useful where the volume for the current addressee is the same as the volume for other addressees within the window. This is not true for the window W1 in Table 3 but it is true for the window W2 in Table 3. In Table 3, the cluster value Dav is listed in the row with the addressee. For the second window W2, which is four rows wide, although the current mail piece 122 in front of the bar code reader 118 is the mail piece e1999, all four of the mail pieces within the window W2 have the same volume of 4. Therefore, in step 270, the cluster value Dav is examined all four addressees within the window W2. It is seen that the addressee e2001 has the lowest cluster value, which is=1 and that cluster value indicates that the first three occurring mail pieces for the addressee e2001 are adjacent to one another. Thus, in step 270, the mail piece e2001 is selected for assignment to the available pocket and the sorter 124 sorts the next sequence of letters 122 until it comes to the first occurring letter for addressee e2001, which is at location 3011, and this mail piece is sorted into the available pocket and that available pocket remains assigned to the addressee e2001 until all the remaining three mail pieces are sorted into that pocket for that addressee. Then step 270 of FIG. 9 flows to step 272 where the addressee is assigned to the unassigned pocket and then the flow proceeds to step 274, which updates Tables 2 and 4. In step 274, the pocket assigned value C1 is set=1 in Tables 2 and 4, and the number left to sort value C2 is decremented by 1 in Tables 2 and 4. Then in step 276, the letter is assigned to the pocket as is shown in FIG. 10. Then the flow proceeds to step 278 which goes to the checking step for the value of C2 which is step 266. In step 266, as was discussed before, a check is made to see if the number left to sort value C2 is=0. If it is, then the steps set forth in 266 are carried out. In either case, after step 266, the flow proceeds to the read step 262 to read the next letter's bar code. When there are no more letters to sort in the sorter, then in step 280, the program returns to the main program.

Reference to Tables 2, 3 and 4 will illustrate some examples of the invention in the last sorting pass. In Table 3, as the first letter in the stack e is read by the bar code reader 118, it is identified as being addressed to the addressee e3000 and Table 3 shows that this is the first letter in the stack with LOC 1=1 which indicates the start of a new cycle for the sorter. In Table 2 the entire column for rejects in cycle (C3) is reset to 0. The volume for the addressee e3000 is 3 and its cluster value Dav is 2500. The first window W1 begins at the currently read letter for addressee e3000 and extends for the next three addressees whose sorting has not yet been completed, as is indicated by C4. This includes the addressee e1000 whose first letter occurs at location LOC 1=2 the first letter for the addressee e4000, whose first letter occurs at LOC 1=5, and the first letter for the addressee e370, whose first letter occurs at LOC 1=8. In accordance with the invention, the volume for each of addressees is compared to determine which has the largest volume and it is found that the fourth letter down, namely e370, has the largest volume of 15. Thus, the addressee e370 will be selected as the addressee for assignment to an available pocket in the sorter. Thus, the first letter passing the bar code reader 118 to addressee e3000 is rejected and its reject value C3 is set=1 as can be seen in Table 2. In a similar manner, the second letter which passes the bar code reader 118, namely the letter directed to addressee e1000, is rejected and the value C3 for that addressee is set=1, as can be seen in Table 2. And in a similar manner, the which passes the bar code reader 118, namely the letter directed to the addressee e4000 is rejected, and the reject value C3 is set=1, as can be seen in Table 2. When the letter directed to addressee e370 passes the bar code reader 118, in accordance with the invention, it is assigned to an available pocket, in this case 01' shown in Table 4. The value C1 is set=1 for the pocket assigned in Tables 2 and 4 and the number left to sort value C2 is decremented by 1 from 15 to 14 in Tables 2 and 4. In this manner, the first occurring letter of the four letters passing the bar code reader 118, which has the highest unsorted volume is assigned the next available pocket for sorting. Since the letter at LOC 1=8 is the first occurring letter for the addressee e370, and since there have been no rejects for that addressee during this sorting cycle, all 15 letters directed to the addressee e370 will be sorted out into pocket 01' during the current sorting cycle.

As consecutive letters pass by the bar code reader 118, the window in Table 3 proceeds down the table with the window starting at the currently read letter, if it is the first occurring letter to that addressee, and the window spanning a total of four letters. The size of the window can be changed to suit various applications. Later in the sorting cycle as the window proceeds down until it reaches LOC 1=3,000, as is shown Table 3, the first occurrence of a letter to addressee e1999 occurs. The window W2 in Table 3 spans the addressee e1999 and the next three addressees in the table. All four addressees e1999, e2003, e1998 and e2001 have a volume of four letters. The cluster value Dav is 900 for the addressee e1999 and ranges up to 1500 and 3000 before going down to a value of 1 for the addressee e2001. In accordance with the invention, if all of the addressees within the window in Table 3 have the same volume, then the cluster value is analyzed to determine if there is another addressee within the window besides the currently read addressee e1999, which has a lower magnitude cluster value Dav. In the example shown in Table 3, the addressee e2001 has a cluster value Dav of 1. This means that the first three letters for that addressee are adjacent to one another and it is likely that all four letters are clustered together, and therefore, in accordance with the invention, the addressee e2001 is selected for assignment to the next available pocket. Currently, the letter addressed to addressee e1999 is in front of the bar code reader 118 and it is rejected and its value of C3 is set=1 in Table 2. The next addressed to addressee e2003 is read and rejected and the value C3 is set=1. And the next letter e1998 is read and rejected and its value of C3 is set=1. Then the letter addressed to the addressee e2001 is read and is assigned to the pocket 94'. The pocket assigned value C1 is set =1 in Tables 2 and 4 and the number left to sort value C2 is decremented from its current value of 4 to a new value of 3 in Tables 2 and 4. Then, the next two letters, at least, will be also addressed to the addressee e2001 and will be immediately sorted into the pocket 94'. Since there were no rejects for this addressee e2001 during this cycle, all of the letters for this addressee will be sorted into the pocket 94' before the end of the cycle and most likely soon after the sorting of the first three letters, since it is likely that since three out of the four letters that were clustered together, the fourth letter will also be in close proximity. In this manner, once an addressee is assigned a pocket, letters addressed to that addressee will be sorted out of the stack e at a maximum rate, in accordance with the invention.

FIG. 10 shows the last pass continuous sorting for the addressees 4N+1 to the last addressee. It shows the relationship of the sorter 124 and the conveyor 148 for continuously recycling rejected mail pieces back to the bar code reader for subsequent sorting cycles.

FIG. 11 shows a carrier assignment route table for five carriers in the receiving post office 100.

FIG. 12 shows a flow diagram of the routine 310 to sort packets by carrier. In step 312, for each sorting pocket from 1 through N, the loop starts with step 314 prompting the operator to read the bar code on top of the mail piece in the packet. This can be done with the bar code wand 134. Then step 316, the system gets the mail piece electronic folder 136 from the memory 106. In step 318, the addressee, street name and building number are accessed from the electronic mail piece folder 136. Then in step 320, the carrier assignment is looked up in the routing table 300. In step 322, the packet is assigned to the indicated carrier. Then the loop continues in step 324 by looping back to step 312 until all packets have been assigned to an appropriate carrier. All of the packets for all of the addressees from a1 through e5000 are assigned to their appropriate carrier in this manner.

Figure 13:
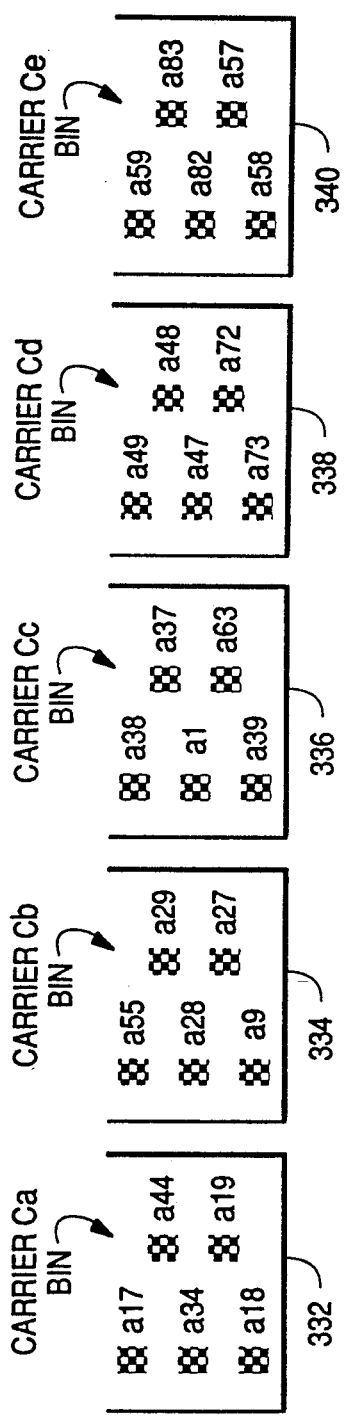
FIG. 13 illustrates the sorting of packets by carrier in random order into bins.

FIG. 13 shows how the packets have been sorted to their appropriate carrier. In particular, carrier Ca has packets accumulated in bin 332, carrier Cb has packets accumulated in bin 334, carrier Cc has packets accumulated in bin 336, carrier Cd has packets accumulated in bin 338, and carrier Ce has packets accumulated in bin 340.

Figure 14:
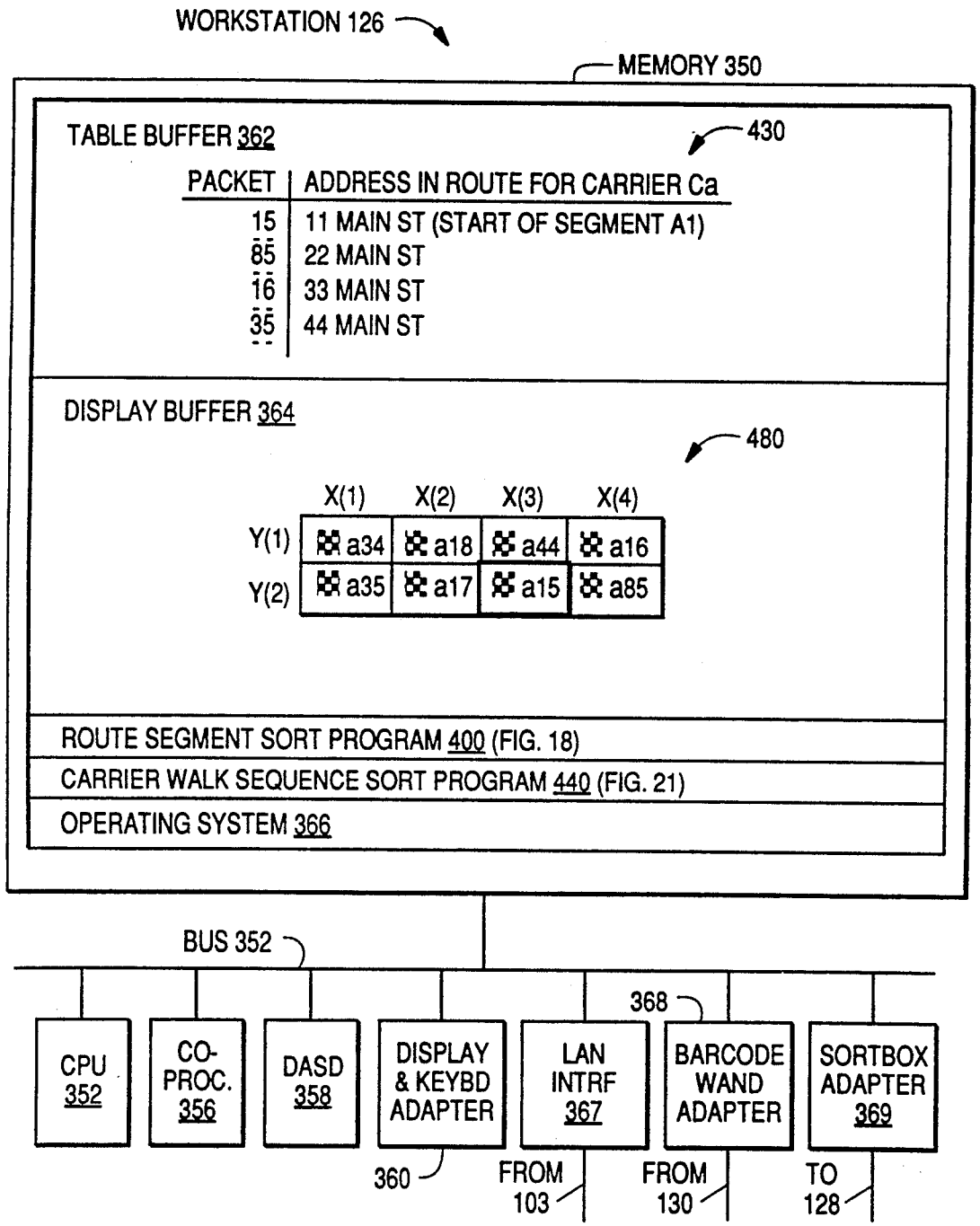
FIG. 14 is a system block diagram of the carrier's work station 126.

FIG. 14 is a system block diagram of a carrier's workstation 126. The workstation includes a bus 352 which interconnects the memory 350 with the CPU 352, an optional co-processor 356, a DASD 358, a keyboard and display adapter 360, a local area network interface 367 which connects the workstation to the bus 103, a bar code wand adapter 368 which is connected to the wand 130, and a sorting case adapter 369 which is connected to the sorting case 128. The memory 350 is partitioned into a table buffer 362 which stores a table of assigned packet to addressee in the carrier's walk sequence 430 which can be seen more fully in FIG. 19. Another partition in the memory 350 is the display buffer 364 which stores the image 480 of the sorting case 128 with a particular pigeon hole shown highlighted. This image can be displayed on the workstation or it can also be highlighted with appropriate indicators mounted on the sorting box 128, as is shown in FIG. 15. Another partition in the memory 350 contains the route segment sort program 400 which is shown in FIG. 18. Another partition in the memory 350 stores the carrier walk sequence sort program 440 which is shown in FIG. 21. Another partition in the memory 350 stores the operating system program 336. The programs 400 and 440 are executed by the CPU 352 in the workstation 126.

FIG. 15 shows another view of the sorting case 128 and of the connection 125 to the workstation 126. Each carrier sorts his packets by route segment and he will use the sorting case 128 with its pigeon holes to sort the packets in each route segment. The pigeon holes are identified by x coordinates, x(1) through x(4), and by y coordinates, y(1) to y(2). The wires x(1)' through x(4)' and y(1)' to y(2)' provide a Cartesian coordinate signaling system to enable the illumination of a signal light in any pigeon hole of the sorting case 128 corresponding to a highlighted pigeon hole shown in the image 480 in the display buffer 364 of the workstation 126.

Figure 16:
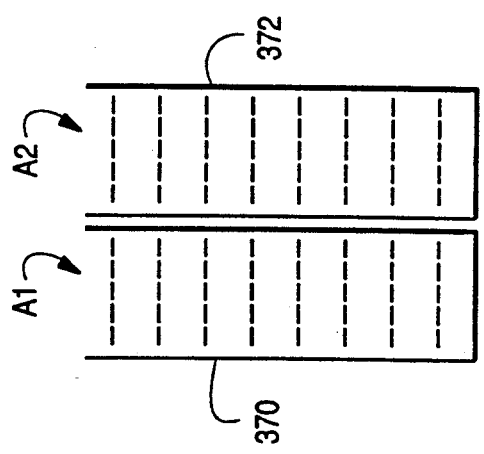
FIG. 16 is a diagram of the carrier's last in, first out (LIFO) stacks.

FIG. 16 shows two last in, first out (LIFO) stacks, each being used for a segment in the carrier's walk sequence route. In this example, the carrier's bin in FIG. 13 has 16 packets arranged in random order which have been retrieved from the sorter 124. The sorting case 128 has 8 pigeon holes. Thus, the carrier divides his route into a number of segments sufficient to enable packets from each segment to fit into the 8 pigeon holes of his sorting case 128. If there are w packets in the carrier's bin in FIG. 13 and if there are P Pigeon holes in the carrier's sorting case 128, then dividing w packets by P pigeon holes gets a quotient of Q and the carrier partitions his route into Q sequential segments if there are no remainders in the division. If there is a remainder in the division, then the carrier divides his route into Q+1 segments. In this case, the number of segments S is equal to 16 packets divided by 8 pigeon holes, or 2 segments. The carrier uses 2 LIFO stacks A1 and A2 in this method of sorting the packets down to carrier walk sequence. The LIFO stack 370 and the LIFO 372 are shown in FIG. 16.

Figure 17:
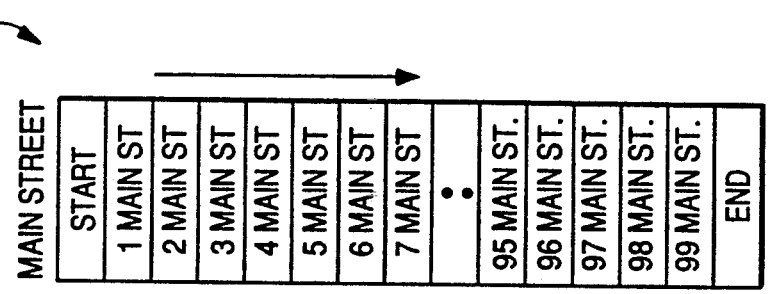
FIG. 17 illustrates the carrier walk sequence table.

FIG. 17 shows the walk sequence table for the route used by the carrier Ca for his route on Main Street and it shows that addresses going from 1 through 99 constitute the start and finish, respectively, of his route.

FIG. 18 is a flow diagram 400 of a routine to sort random ordered packets which have been assigned to a carrier, into route segments. Step 402 starts a loop for each packet i, from 1 to P. In step 404, a prompt is generated to the carrier to use his bar code wand 130 to read the bar code 123 on the top mail piece of the packet i. Then in step 406, the system accesses the mail piece electronic folder for the addressee represented by the packet i. Then in step 408, the addressee, street name and building number are accessed from the electronic folder. Then in step 410, the carrier walk sequence is looked up for the carrier's route. In step 412, the packet's addressee is assigned to the carrier's walk sequence. Then in step 414, the route segment S is identified for this packet. In this case, it either occupies a segment A1 or a segment A2. Then in step 416, a prompt is generated to the carrier to place the physical packet into the identified LIFO stack, either A1 or A2. In step 418, the loop continues back to step 402. After all P packets have been processed in this manner, step 420 goes to the carrier walk sequence sort routine 440 of FIG. 21.

Figures 19, 20:
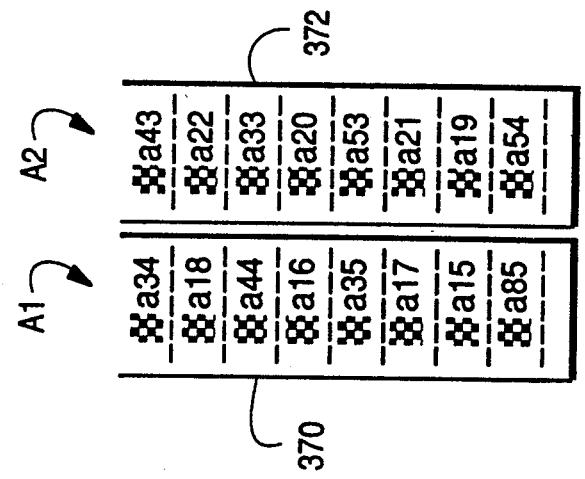
FIG. 19 illustrates a table of assigned packets to address in a carrier's walk sequence.
FIG. 20 illustrates the LIFO stacks used by a carrier to separate his packets by segments in his walk sequence.

FIG. 19 illustrates a table 430 of assigned packet to address in the carrier's walk sequence for the carrier Ca. Note that the packets are related to the particular address in the carrier walk sequence starting with the segment A1 and continuing with the segment A2 down to the end of the carrier walk sequence.

FIG. 20 shows the carrier Ca has separated his packets by the segments in his walk sequence, reading the addressee's bar code for each packet and inserting it into the LIFO stack A1 or A2, in a random order within each stack 370 or 372. Alternately, the first segment A1 can have its packets initially inserted sequentially into the sorting case 128.

FIG. 21 is a flow diagram of a routine 440 to sort the packets from route segments into the carrier walk sequence. This routine continues from the route segment sort program 400 in FIG. 18. Starting with step 442, a loop begins for each LIFO stack k. Then in step 444 a second loop starts for each packet i from 1 to P in a first stack. In step 446, a prompt is generated to the carrier so that he can place a physical packet i into a sequential or designated pigeon hole in the sort case 128 and the location of the pigeon hole X(m), Y(n) is stored in the workstation memory. Then in step 450 the loop continues by returning to step 444. After all P packets for the first segment are placed in respective pigeon holes of the sorting case 128, then in step 460 a second loop is started for each packet i from 1 through P and in step 462 the packet (i) is designated in the image 480 shown in FIG. 14, corresponding to the segment's walk sequence order. Then in step 464, a prompt is generated to the carrier to remove the designated packet from the sorting case 128 in the walk sequence order. The designation of the particular pigeon hole for the particular packet (i) can be either by the display of the pigeon hole location on the display screen corresponding to the image 480 at the workstation 126, or alternately by the illumination of a signal light in the pigeon hole itself on the display case 128, as is shown in FIG. 15. Then the flow proceeds to step 466, which continues the loop at step 460 for all of the packets in the sorting case 128. Then the flow proceeds to step 468 which returns to step 442 for the next LIFO stack A2. After all of the LIFO stacks for all of the segments in the carrier's route have been processed by the routine 440, all of the packets assigned to the carrier should be arranged in the carrier walk sequence.

FIG. 22 shows the image 480 of the sorting case 128 where packets have been inserted from the LIFO stack A1 into the sorting case, with each pigeon hole being related to each packet. In FIG. 23, the image 480 shows the designation of a first pigeon hole X(3), Y(2) in the sorting box holding the first addressee's packet 15 in walk sequence for the first segment A1. The carrier is prompted to remove the first packet. Then in FIG. 24, the image 480 is shown designating the second pigeon hole X(4) Y(2) in the sorting case holding the second addressee packet 85 in the walk sequence of the segment A1. The carrier is prompted to remove the second packet.

Figure 25:
FIG. 25 illustrates the arrangement of mail pieces in a segment sorted by walk sequence.
Figure 27:
FIG. 27 illustrates a second carrier's mail pieces sorted by walk sequence, in accordance with the invention.
Figure 28:
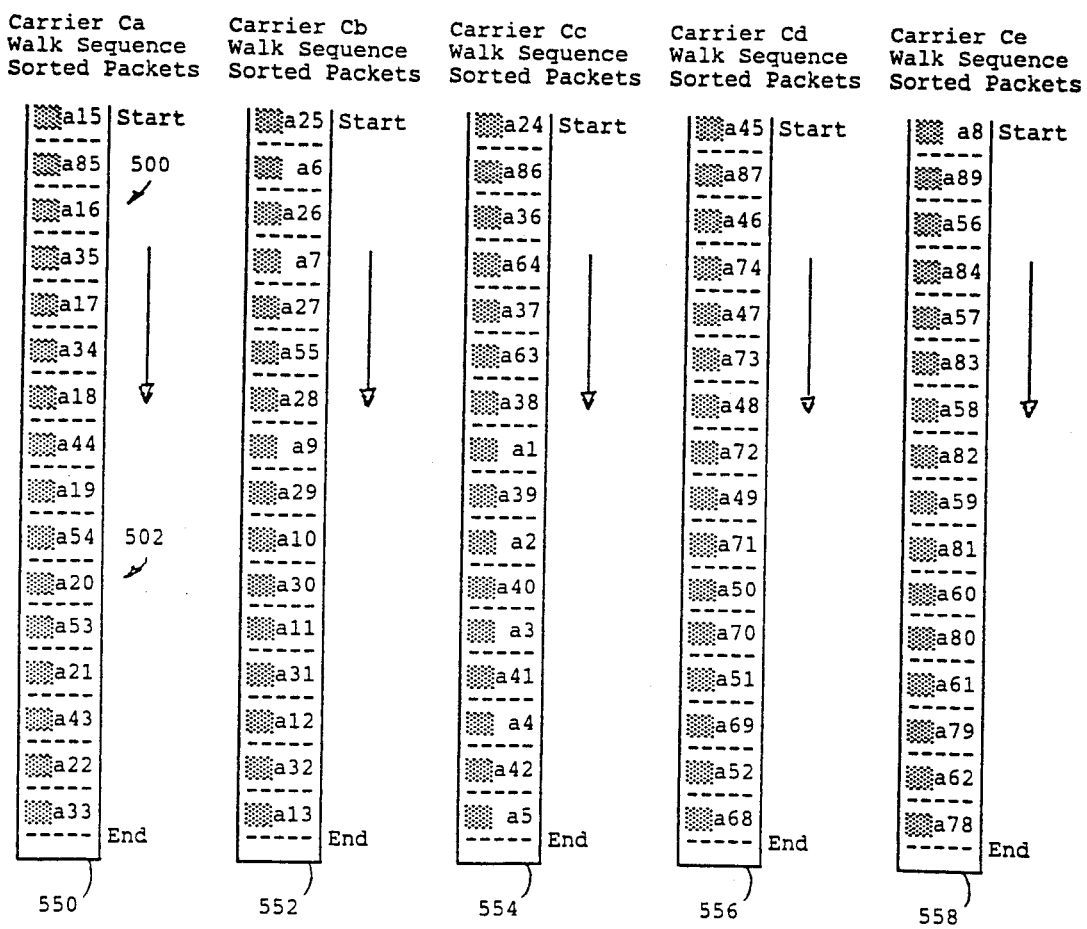
FIG. 28 illustrates the arrangement of sorted packets of mail by carrier walk sequence for five carriers in the destination post office, in accordance with the invention.

FIG. 25 shows the segment A1 packets sorted by walk sequence, the segment being designated 500. FIG. 26 shows the second segment A2, packets sorted by walk sequence, the segment being designated 502. FIG. 27 shows a second carrier Cb's packets which are sorted by walk sequence for his route, the walk sequence arrangement being designated 552. FIG. 28 shows the sorted packets by carrier walk sequence for five different carriers in the receiving post office 100. The carrier Ca has his packets arranged in walk sequence order and it is shown that his walk sequence 550 comprises the first segment 500 and second segment 502. The carrier Cb has his walk sequence packets 552 arranged as shown. The carrier C has his packets 554 arranged in walk sequence order. The carrier Cd has his packets 556 arranged in walk sequence order. The carrier Ce has his packets 558 arranged in walk sequence order, in accordance with the invention.

The resulting invention enables the optimized sorting of mail pieces with a reduced number of sorting passes and a mapped distribution of the resulting sorted mail packets down to carrier walk sequence.

TABLE 1

| Volume Ordered Table for First through Fourth Sorting Passes | |
|---|---|
| Addressee Ad | Volume V(Ad) |
| a1 | 6500 |
| a2 | 5000 |
| a3 | 3500 |
| a4 | 2000 |
| a5 | 1500 |
| . | . . |
| . | . . |
| . | . . |
| a67 | 30 |
| a68 | 30 |
| . | . . |
| . | . . |
| a91 | 20 |
| a92 | 20 |
| b93 | 20 |
| b94 | 20 |
| . | . |
| . | . |
| . | . |

TABLE 1-continued

Volume Ordered Table for First through Fourth Sorting Passes

| Addressee Ad | Volume V(Ad) |
|---|---|
| b183 | 18 |
| b184 | 18 |
| c185 | 18 |
| c186 | 18 |
| . | . |
| . | . |
| c275 | 16 |
| c276 | 16 |
| d277 | 16 |
| d278 | 16 |
| . | . |
| . | . |
| d367 | 15 |
| d368 | 15 |

TABLE 3

Location (LOC1) Ordered Addressee Table for Last Sorting Pass

| LOC1 | Addressee Ad | Sort Done (C4) | Volume V(Ad) | Cluster Dav | |
|---|---|---|---|---|---|
| 1 | e3000 | 0 | 3 | 2500 | |
| 2 | e1000 | 0 | 6 | 320 | First Window W1 |
| 5 | e4000 | 0 | 2 | 600 | |
| 8 | e370 | 0 | 15 | 240 | |
| . | . | . | . | . | |
| 3000 | e1999 | 0 | 4 | 900 | |
| 3002 | e2003 | 0 | 4 | 1500 | Second Window W2 |
| 3005 | e1998 | 0 | 4 | 3000 | |
| 3011 | e2001 | 0 | 4 | 1 | |
| . | . | . | . | . | |

TABLE 4

Pocket Assignment Table

| Pocket Number | 01' | 02' | 03' | 04' | 05' | ... | 92' | 93' | 94' | 95' | 96' |
|---|---|---|---|---|---|---|---|---|---|---|---|
| Assigned (C1) | 1 | 1 | 0 | 1 | 1 | ... | 0 | 1 | 1 | 1 | 0 |
| Addressee (Ad) | e370 | e3800 | — | e896 | e2840 | | — | e2539 | e2001 | e478 | — |
| # Left To Sort (C2) | 14 | 2 | — | 5 | 3 | | — | 2 | 3 | 10 | — |

Although a specific embodiment of the invention has been disclosed, it will be understood by those having

TABLE 2

Volume Ordered Addressee Table for Last Sorting Pass

| Addressee Ad | Volume V(Ad) | Location LOC1 | Location LOC2 | Location LOC3 | Cluster Dav | Pocket Assigned (C1) | # Left to Sort (C2) | Rejects in Cycle (C3) | Sort Done (C4) |
|---|---|---|---|---|---|---|---|---|---|
| e369 | 15 | 820 | 1640 | 1641 | 410 | 0 | 15 | 0 | 0 |
| e370 | 15 | 8 | 248 | 480 | 240 | 1 | 14 | 0 | 0 |
| e371 | 14 | 2040 | 2041 | 2042 | 1 | 0 | 14 | 0 | 0 |
| . | . | . | . | . | . | . | . | . | . |
| e1000 | 6 | 2 | 320 | 640 | 320 | 0 | 6 | 1 | 0 |
| e1001 | 6 | 319 | 324 | 329 | 5 | 0 | 6 | 0 | 0 |
| . | . | . | . | . | . | . | . | . | . |
| e1998 | 4 | 3005 | 5200 | 9000 | 3000 | 0 | 4 | 1 | 0 |
| e1999 | 4 | 3000 | 3200 | 4800 | 900 | 0 | 4 | 1 | 0 |
| e2000 | 4 | 5000 | 7000 | 8000 | 1500 | 0 | 4 | 0 | 0 |
| e2001 | 4 | 3011 | 3012 | 3013 | 1 | 1 | 3 | 0 | 0 |
| e2002 | 4 | 4000 | 6000 | 6500 | 1250 | 0 | 4 | 0 | 0 |
| e2003 | 4 | 3002 | 3900 | 6000 | 1500 | 0 | 4 | 1 | 0 |
| . | . | . | . | . | . | . | . | . | . |
| e3000 | 3 | 1 | 4998 | 4999 | 2500 | 0 | 3 | 1 | 0 |
| e3001 | 3 | 598 | 600 | 602 | 2 | 0 | 3 | 0 | 0 |
| . | . | . | . | . | . | . | . | . | . |
| e4000 | 2 | 5 | 605 | — | 600 | 0 | 2 | 1 | 0 |
| e4001 | 2 | 3667 | 3668 | — | 1 | 0 | 2 | 0 | 0 |
| . | . | . | . | . | . | . | . | . | . |
| e4997 | 1 | 1889 | — | — | 1 | 0 | 1 | 0 | 0 |
| e4998 | 1 | 2776 | — | — | 1 | 0 | 1 | 0 | 0 |
| e4999 | 1 | 4720 | — | — | 1 | 0 | 1 | 0 | 0 |
| e5000 | 1 | 638 | — | — | 1 | 0 | 1 | 0 | 0 | skill in the art that changes can be made to that specific embodiment without departing from the spirit and the scope of the invention.

What is claimed is:

1. A data processing system to optimize the sorting of mail, comprising:

a data communications receiver at a destination postal region, connected to a data communications network, for receiving addressee data for mail pieces to be delivered to said destination postal region;

a data processor coupled to said data communications receiver, for processing said addressee data to compute addressee volume values for mail addressed to addressees at said destination postal region;

a mail piece sorter coupled to said data processor, having a plurality of pockets, said data processor assigned individual ones of said pockets to respective ones of said addressees in an order related to said addressee volume values;

said mail piece sorter having a plurality of M pockets, said data processor assigning a subplurality of N of said pockets to N addresses having the N highest addressee volume values;

said data processor assigning an additional pocket of said plurality of M pockets for mail pieces addressed to a second plurality addressees who have addressee volume values less than those of said N addressees having the N highest addressee volume values.

2. The data processing system of claim 1, which further comprises:

a code reading device coupled to said data processor, for reading a code on each of said mail pieces representing said addressee data;

said data processor further sorting said second plurality of addressees by reading said code on a second subplurality of said mail pieces with said code reading device and assigning one of said M pockets to one of said second plurality of addressees having the largest magnitude addressee volume value in said second subplurality.

3. The data processing system of claim 1, which further comprises:

a code reading device coupled to said data processor, for reading a code on each of said mail pieces representing said addressee data;

said data processor further sorting said second plurality of addressees by reading said code on a second subplurality of said mail pieces with said code reading device and assigning one of said M pockets to one of said second plurality of addressees having the greatest quantity of mail pieces proximate to said code reading device, in said subplurality.

4. The data processing system of claim 1, which further comprises:

a second code reading device coupled to said data processor, for reading said code on one of said mail pieces in a packet of mail pieces in one of said pockets;

said data processor receiving said code from said second code reading device and computing a carrier route assignment for said packet.

5. The data processing system of claim 1, which further comprises:

said data processor computing a carrier route assignment for a packet of said mail pieces in one of said pockets addressed to an addressee;

a workstation coupled to said data processor, including a second code reading device, for reading said code on one of said mail pieces in said packet and assigning said packet to a carrier walk sequence in said carrier route.

6. The data processing system of claim 1, which further comprises:

said data processor computing a carrier route assignment for a packet of said mail pieces in one of said pockets addressed to an addressee;

a workstation coupled to said data processor, including a second code reading device, for reading said code on one of said mail pieces n said packet;

a sorting case having indicators coupled to said workstation, for receiving signals from said workstation indicating said packet;

said workstation assigning said packet to a carrier walk sequence in said carrier route and manifesting said carrier walk sequence by signalling one of said indicators proximate to said packet in said sorting case.

7. The data processing system of claim 1, which further comprises:

said data processor computing a carrier route assignment for a packet of said mail pieces in one of said pockets addressed to an addressee;

a workstation coupled to said data processor, including a second code reading device, for reading said code on one of said mail pieces in said packet;

a plurality of last in, first out stacks for arranging a plurality of packets from said pockets into segments of said carrier route, said data processor computing which one of said plurality of stacks corresponds to a segment of said route for said packet;

a sorting case for arranging a plurality of packets transferred from one of said plurality of stacks into a carrier walk sequence, said case having indicators coupled to said workstation, for receiving signals from said workstation indicating said packet;

said workstation assigning said packet to a carrier walk sequence in said carrier route and manifesting said carrier walk sequence by signalling one of said indicators proximate to said packet in said sorting case.

8. A data processing method to optimize the sorting of mail, comprising the steps of:

receiving in a data communications receiver at a destination postal region, connected to a data communications network, addressee data for mail pieces to be delivered to said destination postal region;

processing in a data processor coupled to said data communications receiver, said addressee data to compute addressee volume values for mail addressed to addressees at said destination postal region;

assigning with said data processor, individual ones of a plurality of pockets in a mail piece sorter, to respective ones of said addressees in an order related to said addressee volume values;

said mail piece sorter having a plurality of M pockets, said data processor assigning a subplurality of N of said pockets to N addressees having the N highest addressee volume values; and said data processor assigning an additional pocket of said plurality of M pockets for mail pieces addressed to a second plurality addressees who have addressee volume values less than those of said N addressees having the N highest addressee volume values.

9. The data processing method of claim 8, which further comprises the steps of:
reading with a code reading device coupled to said data processor, a code on each of said mail pieces representing said addressee data;
said data processor further sorting said second plurality of addressees by reading said code on a second subplurality of said mail pieces with said code reading device and assigning one of said M pockets to one of said second plurality of addressees having the largest magnitude addressee volume value in said second subplurality.

10. The data processing method of claim 8, which further comprises the steps of:
reading with a code reading device coupled to said data processor, a code on each of said mail pieces representing said addressee data;
said data processor further sorting said second plurality of addressees by reading said code on a second subplurality of said mail pieces with said code reading device and assigning one of said M pockets to one of said second plurality of addressees having the greatest quantity of mail pieces proximate to said code reading device, in said subplurality.

11. The data processing method of claim 8, which further comprises the steps of:
reading with a second code reading device coupled to said data processor, said code on one of said mail pieces in a packet of mail pieces in one of said pockets;
said data processor receiving said code from said second code reading device and computing a carrier route assignment for said packet.

12. The data processing method of claim 8, which further comprises the steps of:
said data processor computing a carrier route assignment for a packet of said mail pieces in one of said pockets addressed to an addressee;
assigning with a workstation coupled to said data processor, said packet to a carrier walk sequence in said carrier route.

13. The data processing method of claim 8, which further comprises the steps of:
said data processor computing a carrier route assignment for a packet of said mail pieces in one of said pockets addressed to an addressee;
reading with a second code reading device, said code on one of said mail pieces in said packet;
receiving signals at a sorting case having indicators indicating said packet;
assigning said packet to a carrier walk sequence in said carrier route and manifesting said carrier walk sequence by signalling one of said indicators proximate to said packet in said sorting case.

14. The data processing method of claim 8, which further comprises the steps of:
said data processor computing a carrier route assignment for a packet of said mail pieces in one of said pockets addressed to an addressee;
reading said code on one of said mail pieces in said packet;
arranging a plurality of packets from said pockets into segments of said carrier route, said data processor computing which one of a plurality of stacks corresponds to a segment of said route for said packet;
arranging a plurality of packets transferred from one of said plurality of stacks into a carrier walk sequence, in a sorting case having indicators for receiving signals indicating said packet;
assigning said packet to a carrier walk sequence in said carrier route and manifesting said carrier walk sequence by signalling one of said indicators proximate to said packet in said sorting case.

15. A data processing method to optimize the sorting of mail, comprising the steps of:
receiving in a data communications receiver at a destination postal region, connected to a data communications network, addressee data for mail pieces to be delivered to said destination postal region;
processing in a data processor coupled to said data communications receiver, said addressee data to compute addressee volume values for mail addressed to addressees at said destination postal region;
assigning with said data processor, individual ones of a plurality of M pockets in a mail piece sorter, to respective ones of said addressees in an order related to said addressee volume values;
said data processor assigning a subplurality of N of said M pockets to a first plurality of N addresses having the N highest addressee volume values;
said data processor assigning an additional pocket of said plurality of M pockets for mail pieces addressed to a second plurality addressees who have addressee volume values less than those of said N addressees having the N highest addressee volume values;
sorting with said sorter, a first group of said mail pieces addressed to said first plurality of addressees, into said subplurality of N pockets and sorting a second group of said mail pieces addressed to said second plurality of addressees, into said additional pocket;
said data processor assigning said subplurality of N pockets to at least a portion of said second plurality of addressees; and
sorting with said sorter, said second group of said mail pieces addressed to said second plurality of addressees, into said subplurality of N pockets.

16. The data processing method of claim 15, which further comprises the steps of:
reading with a code reading device coupled to said data processor, a code on one of said mail pieces in a packet of mail pieces in one of said pockets;
said data processor receiving said code from said code reading device and computing a carrier route assignment for said packet.

17. The data processing method of claim 15, which further comprises the steps of:
said data processor computing a carrier route assignment for a packet of said mail pieces in one of said pockets addressed to an addressee;
assigning with a workstation coupled to said data processor, said packet to a carrier walk sequence in said carrier route.

18. The data processing method of claim 15, which further comprises the steps of:
said data processor computing a carrier route assignment for a packet of said mail pieces in one of said pockets addressed to an addressee;

reading with a code reading device coupled to said data processor, a code on one of said mail pieces in said packet;
receiving signals at a sorting case coupled to said data processor, said case having indicators indicating said packet;
assigning said packet to a carrier walk sequence in said carrier route with said data processor, and manifesting said carrier walk sequence by signalling one of said indicators proximate to said packet in said sorting case.

* * * * *